United States Patent [19]

Bonissone

[11] Patent Number: 4,860,213

[45] Date of Patent: Aug. 22, 1989

[54] REASONING SYSTEM FOR REASONING WITH UNCERTAINTY

[75] Inventor: Piero P. Bonissone, Schenectady, N.Y.

[73] Assignee: General Electric Company, Schenectady, N.Y.

[21] Appl. No.: 103,465

[22] Filed: Oct. 1, 1987

[51] Int. Cl.$^4$ .............................................. G06F 15/36
[52] U.S. Cl. .................................... 364/513; 364/300
[58] Field of Search ................................. 364/513, 300

[56] References Cited

U.S. PATENT DOCUMENTS

| 4,642,782 | 2/1987 | Kemper et al. | 364/513 X |
| 4,649,515 | 3/1987 | Thompson et al. | 364/513 X |
| 4,713,775 | 12/1987 | Scott et al. | 364/513 |

OTHER PUBLICATIONS

"Associative Functions and Abstract Semi–Groups", by Schweizer et al., Publicationes Mathematicae Debrecen, vol. 10, 1963, pp. 69–81.
"A Fuzzy Sets Based Linguistic Approach: Theory and Applications", by Bonissone, Proceedings of the 1980 Winter Simulation Conference (T. I. Oren, S. M. Shub and P. F. Roth, eds) Orlando, Florida, Dec. 1980, pp. 99–111.

Primary Examiner—A. D. Pellinen
Assistant Examiner—H. L. Williams
Attorney, Agent, or Firm—Paul R. Webb, II; James C. Davis, Jr.

[57] ABSTRACT

The invention is directed to an automated rule-based reasoning with uncertainty system and method for practicing same. The system has a three layer structure composed of representation, inference and control layers. Rule firings and conclusions are computed in the inference layer in a manner to propagate uncertainty information through the system in accordance with predetermined formulas designated by the control layer. Rule structures and conclusions and uncertainty information associated therewith are represented to the user in the representation layer.

28 Claims, 7 Drawing Sheets

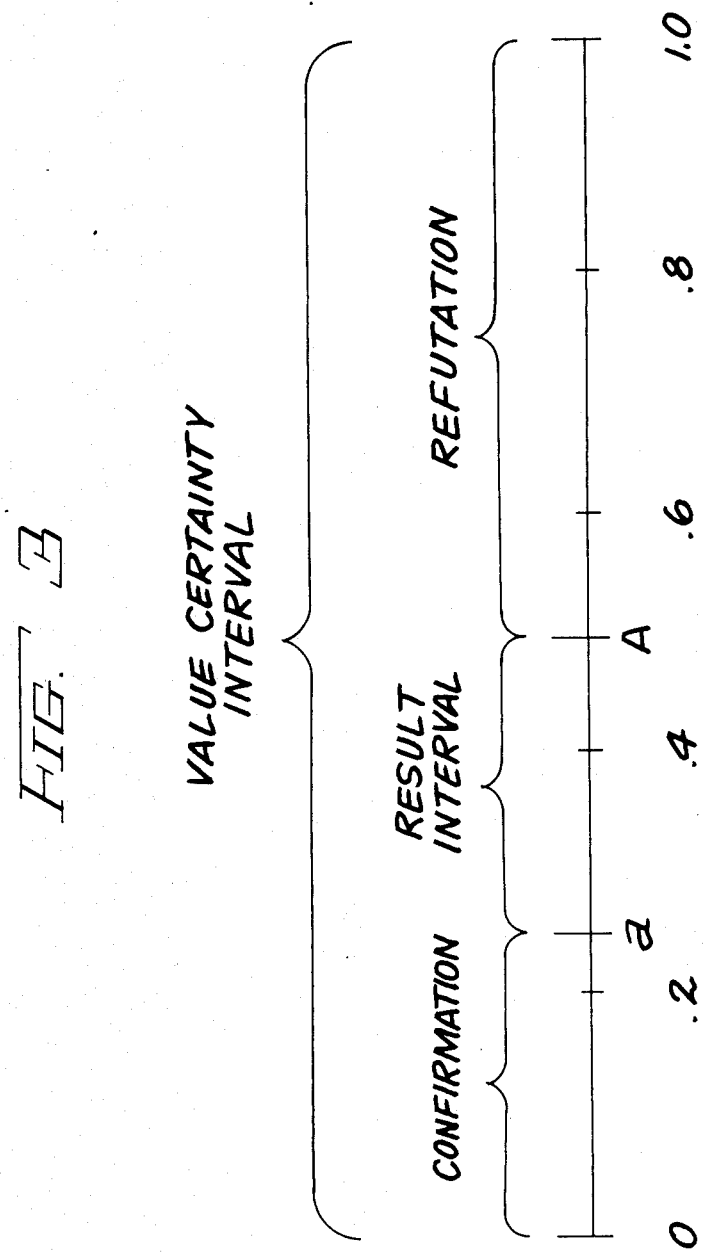

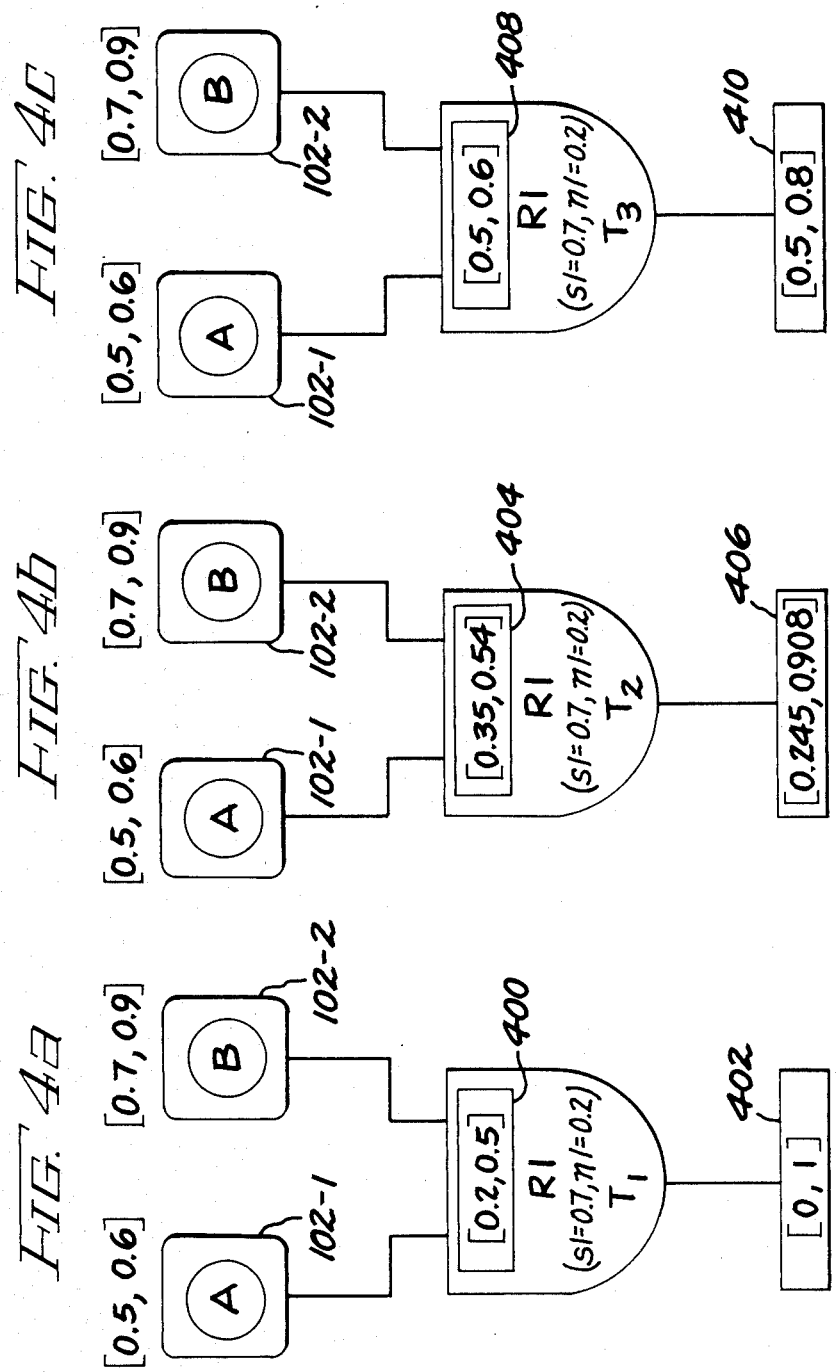

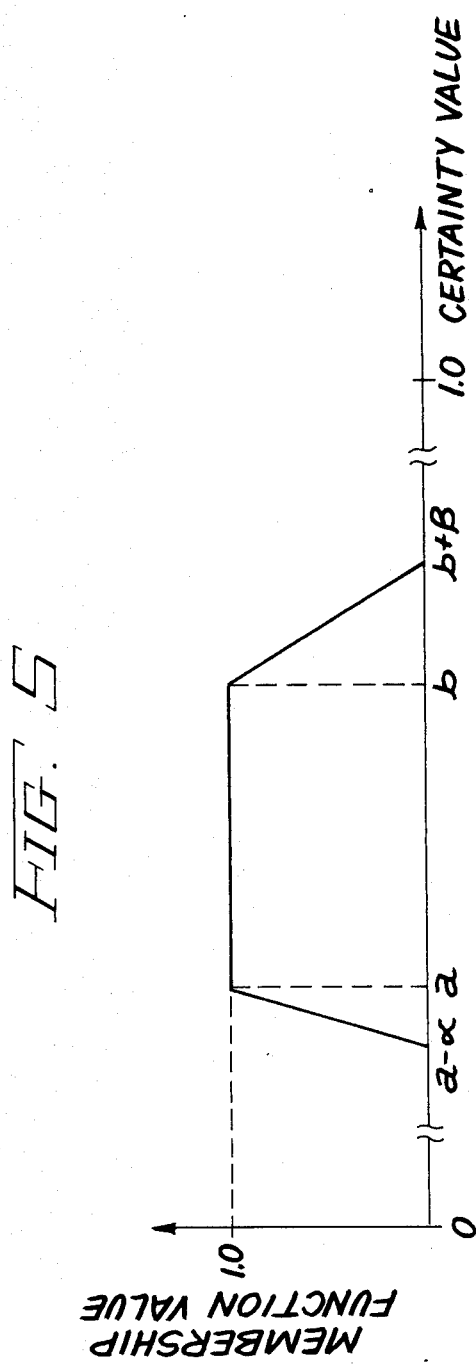

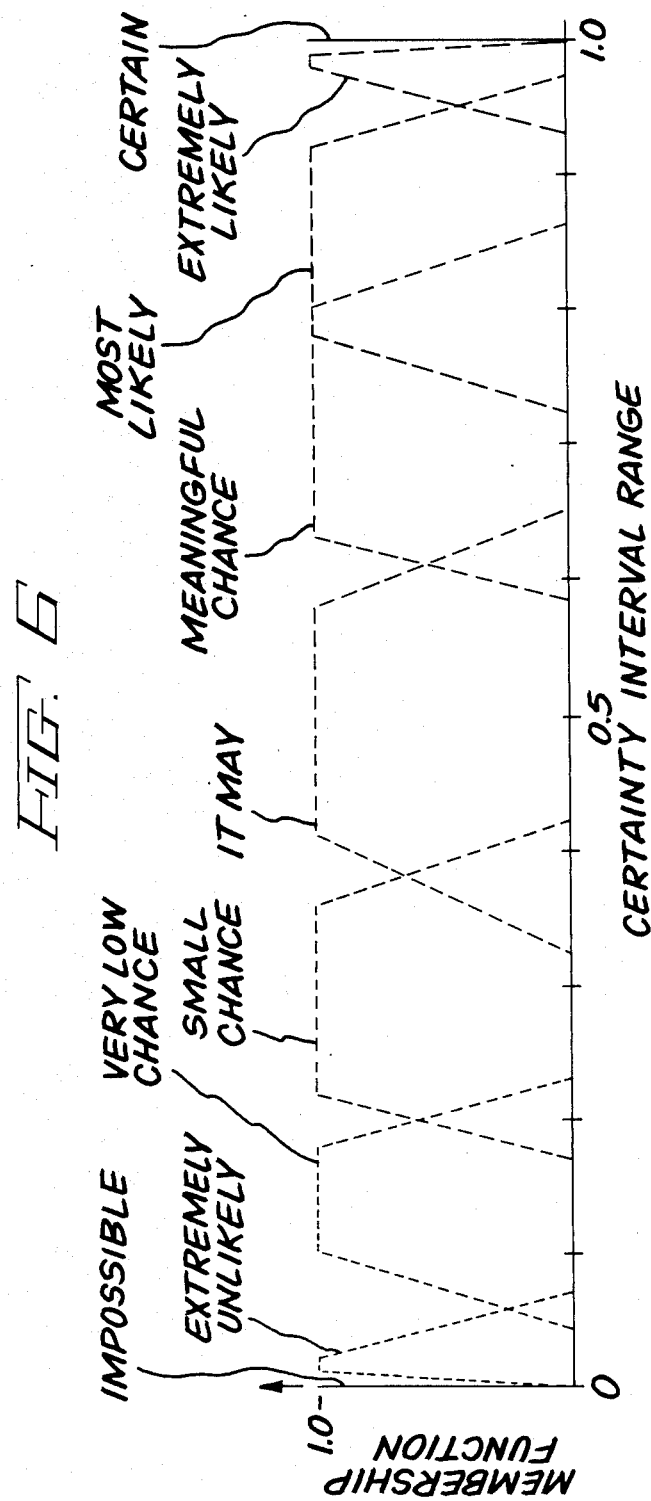

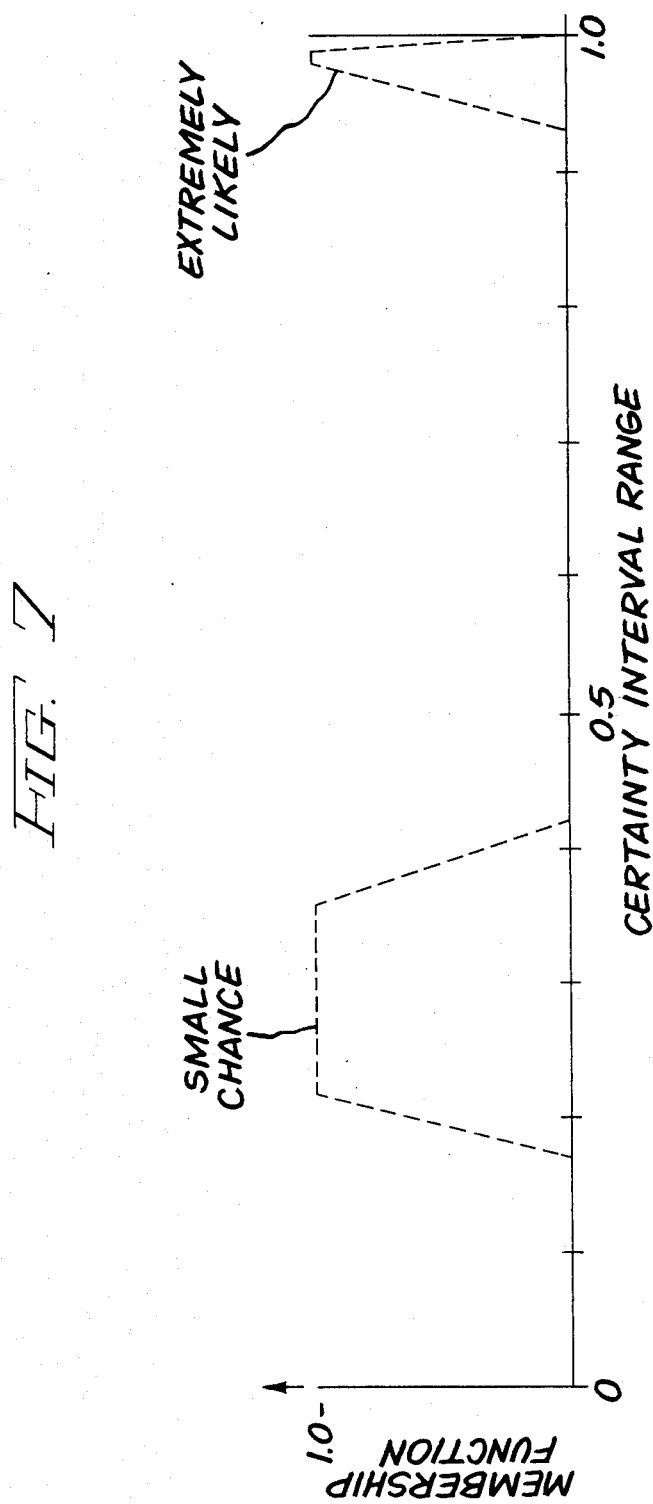

REASONING SYSTEM FOR REASONING WITH UNCERTAINTY

This invention was made with Government support under Contract F30602-85-C-0033 awarded by the Department of the Air Force. The Government has certain rights in this invention.

The present invention is related in general to automated reasoning systems and, more specifically, to an automated reasoning system for reasoning with uncertainty.

BACKGROUND OF THE INVENTION

A reasoning system as used herein is one comprising rules structured to simulate a particular, desired reasoning process. Expert systems are examples of such reasoning systems in which the reasoning methodologies of one or more experts are modeled, so that upon subsequent provision of input data values to the system, the system simulates the expert reasoning to use the input values and reach some conclusion of the modelled reasoning methodology.

The need to adapt automated reasoning systems to address the problems of uncertainty associated with input data values as well as the operation of the rules comprising the system is recognized in the art. There is a recurrent need in such systems to aggregate the uncertain information. Such information must be aggregated to determine the degree to which the premise of a given rule has been satisfied, to propagate the amount of uncertainty through the firing of a given rule, to summarize the findings provided by various rules or knowledge sources and to detect inconsistencies among different sources of knowledge (including conclusions provided by fired rules). Ad hoc procedures for addressing uncertainty have been formulated, as have procedures based on probability theory. Examples of such procedures are set forth in "Artificial Intelligence" by P. H. Winston, Addison-Wesley Publishing Company, Inc., copyright 1984, 1977, pp. 191–197.

These procedures for addressing uncertainty, however, as well as others known in the art, are deficient because they disregard the fundamental issues to be addressed in the operation of an automated reasoning system. Examples of such fundamental issues include the proper representation of information and meta-information, the allowable inference paradigms suitable for the representation, and the explicitly programmable control of such inferences. Thus, the unknown procedures for addressing uncertainty do not readily lend themselves to integration into known, sophisticated automated reasoning systems. Attempts at such integration have been grossly deficient in a variety of respects. For example, some approaches lack expressiveness in their representation paradigms in that they cannot differentiate ignorance (i.e., a lack of information) from conflict (i.e., inconsistent information). Other approaches require that unrealistic assumptions be imposed on the rule hypotheses, for example assumptions of mutual exclusivity and exhaustiveness, and imposed on the evidence used to evaluate rules, for example conditional independence of individual pieces of evidence, all in order to provide a uniform set of combining guidelines for defining the plausible inferences.

It is therefore a principal object of the present invention to provide a system, and method for operation thereof, for reasoning with uncertainty in an automated reasoning system, that is not subject to the aforementioned problems and disadvantages.

SUMMARY OF THE INVENTION

In accordance with the present invention, there is provided a rule-based reasoning system for reasoning with uncertainty and a method for reasoning with uncertainty. The reasoning with uncertainty system comprises a knowledge base portion including a plurality of system rules each having a premise and a conclusion to be determined true upon finding the premise true, where the rule premise comprises at least one clause including a variable to which a value can be assigned. The system further comprises a representation portion for representing to a system user a value certainty interval associated with each value assigned to one of the rule premise variables, the value certainty interval having a lower and an upper bound respectively representative of amounts of confirmation and failure of refutation of the assigned value. The representation portion additionally represents to the user a sufficiency factor and a necessity factor associated with each rule. The sufficiency factor represents a strength of belief that the rule conclusion is true given the rule premise is true. The necessity factor represents a strength of belief that the rule conclusion is false given the rule premise is false. A control portion of the reasoning system selects computational functions in accordance with which the value certainty interval associated with each assigned value is propagated through the system.

The system additionally comprises an inference portion for computing a premise certainty interval from the value certainty intervals respectively associated with the values assigned to the premise clauses. A lower bound of the premise certainty interval is a first computational function of the respective value certainty interval lower bounds, the first function being selected in the control portion. An upper bound of the premise certainty interval is the first function of the respective value certain interval upper bounds. The inference portion fires each rule by computing a conclusion detachment interval having a lower and an upper bound, the conclusion detachment interval lower bound being a second computational function of both the rule sufficiency factor and the premise certainty interval lower bound. The conclusion detachment interval upper bounds is a third computational function of both the rule necessity factor and the premise certainty interval upper bound, the second and third functions being selected by the control portion. The conclusion detachment interval lower and upper bounds are respectively representative of the amounts of certainty and failure of refutation of the rule conclusion.

In the case where the same conclusion is provided by more than one rule in a predetermined group of rules, the inference portion is adapted to compute a conclusion aggregation certainty interval for those same conclusions. A lower bound of the conclusion aggregation interval is a fourth computational function of the conclusion detachment interval lower bounds respectively computed for the rules providing the same conclusion. An upper bound of the conclusion aggregation interval is the fourth function of the conclusion detachment interval upper bounds respectively computed for the rules providing the same conclusion. The conclusion aggregation interval lower and upper bounds are respectively representative of the amounts of certainty and failure of refutation of the aggregated conclusions.

The fourth function is selected by the control portion. The inference portion is further adapted to compute a source consensus certainty interval for a plurality of the conclusion aggregation intervals for the same conclusion, where the source consensus interval is the intersection of the plurality of conclusion aggregation intervals.

The first, second and third predetermined functions comprise triangular norm (T-norm) functions which are selected from a predetermined set of T-norm functions $T_1$, $T_2$ and $T_3$ by the control portion, for use by the inference portion, in computing the premise certainty and conclusion detachment intervals. Each T-norm function corresponds to a different attitude toward uncertainty evaluation. Thus, the T-norm functions $T_1$, $T_2$ and $T_3$ respectively correspond to conservative, intermediate and non-conservative attitudes toward uncertainty evaluation.

The fourth predetermined function is selected from a predetermined set of triangular conorm (T-conorm) functions $S_2$, $S_{2.5}$ and $S_3$ by the control portion for use by the inference portion to compute the conclusion aggregation interval. Thus, the T-conorm functions $S_2$, $S_3$ and $S_{2.5}$ are respectively selected for aggregating the same conclusions provided by uncorrelated rules, correlated rules, and rules characterized as being intermediate between correlated and uncorrelated.

The method of the present invention, for practice on a computer, for reasoning with uncertainty in a rule-based reasoning system, commences with the step of associating a value certainty interval with each value assigned to one of the rule premise variables, the value certainty interval having lower and upper bounds as described above. Next, sufficiency and necessity factors are associated with each rule, those factors being as defined above. The method continues with the computation of the above-described premise certainty interval from the value certainty intervals respectively associated with the values assigned to the premise variables. The lower and upper bounds of the premise certainty interval are as described above. Following this step of the inventive method, each rule may be fired by computing a conclusion detachment interval having lower and upper bounds that are computed and defined as described above.

Upon the same conclusion being provided by more than one rule in a predetermined group of the rules, the method comprises the additional step of aggregating the same conclusions by computing a conclusion aggregation certainty interval having lower and upper bounds computed in the manner described above. If a plurality of conclusion aggregation intervals are computed for the same conclusion, the method comprises the further step of computing a source consensus certainty interval by taking the intersection of the plurality of conclusion aggregation intervals.

With respect to both the system and method of the present invention, it is possible to exclude a selected conclusion from the computation of the conclusion aggregation interval, the selected conclusion having an associated certainty interval. This conclusion exclusion is referred to hereinbelow as a pass function which isolates the selected conclusion from the conclusion aggregation operation. Then, the inference portion computes a source consensus interval that is the intersection of the associated certainty interval of the selected conclusion with each conclusion aggregation interval computed for the same conclusion as the selected conclusion.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

FIG. 3 illustrates a value certainty interval employed in the practice of the present invention;

FIGS. 4a, 4b and 4c illustrate a numerical example showing the propagation of uncertainty through rule firing in accordance with the practice of the present invention;

FIG. 5 is a graphical illustration of a fuzzy number membership function employed in an alternate embodiment of the present invention;

FIG. 6 is a graphical illustration of a nine linguistic term set represented by fuzzy numbers; and FIG. 7 is a graphical illustration of an exemplary certainty interval represented by fuzzy numbers.

DESCRIPTION OF THE INVENTION

The present invention is directed to a system architecture and method for practicing reasoning with uncertainty on a computer. It is not directed to any particular set of rules for carrying out a particular reasoning process but is, rather, directed to an inventive structure for a rule-based reasoning system and method for representing and propagating uncertainty information through the system.

Figure 1:
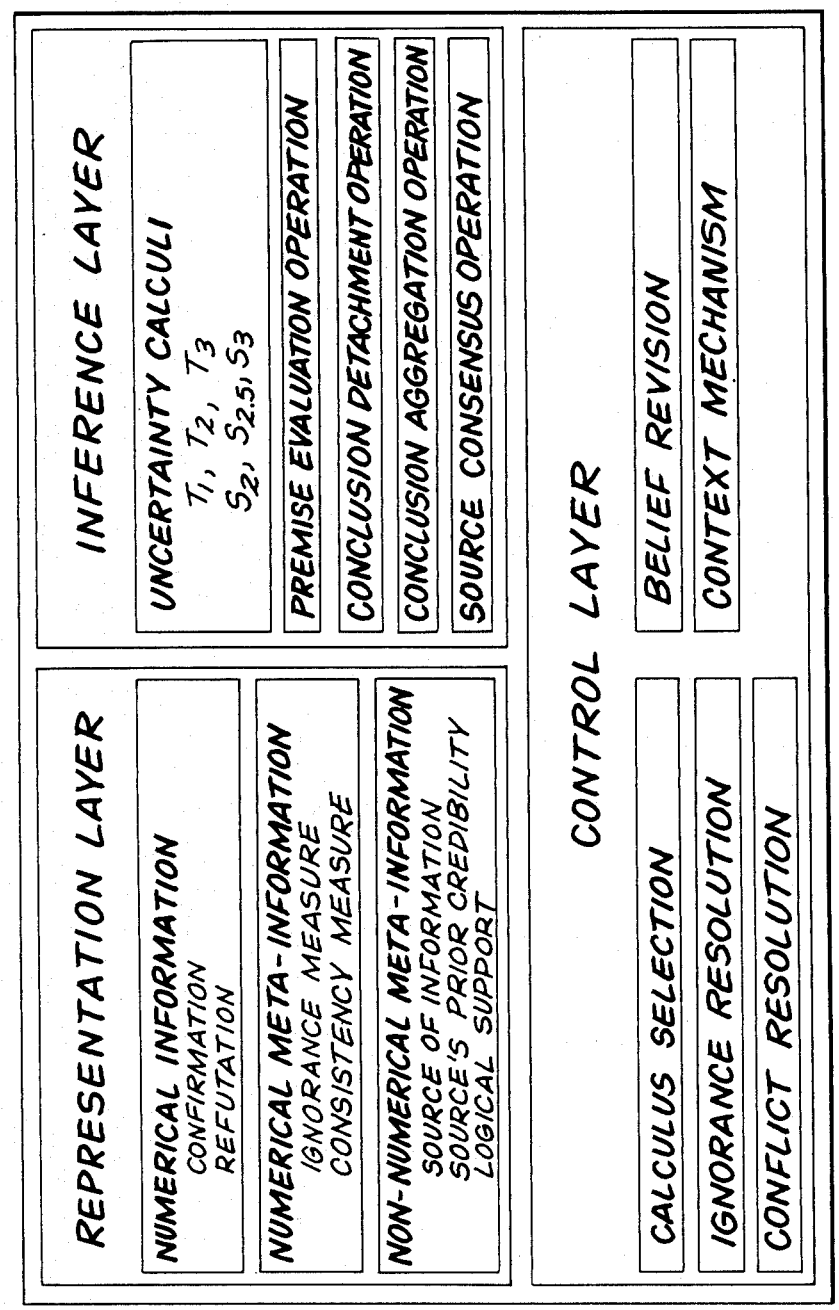
FIG. 1 illustrates a layered structure of the reasoning with uncertainty system of the present invention.

The reasoning with uncertainty system of the present invention is preferably configured to have a three layer structure consisting of a representation layer, an inference layer and a control layer. This three layer structure is illustrated in FIG. 1 with various characteristics of each layer also being indicated, each such characteristics being described in detail hereinbelow. Briefly, the representation layer carries uncertainty information, germane to the reasoning process, that is available to the system user. Such information may be the result of computations performed by the system while other information may be user provided and be the basis for determinations by the system regarding the nature of computations to be performed. The inference layer uses uncertainty information carried in the representation layer to perform the reasoning computations of the system. The control layer also uses uncertainty information contained in the representation layer to control the nature of the computations performed in the inference layer.

Figure 2:
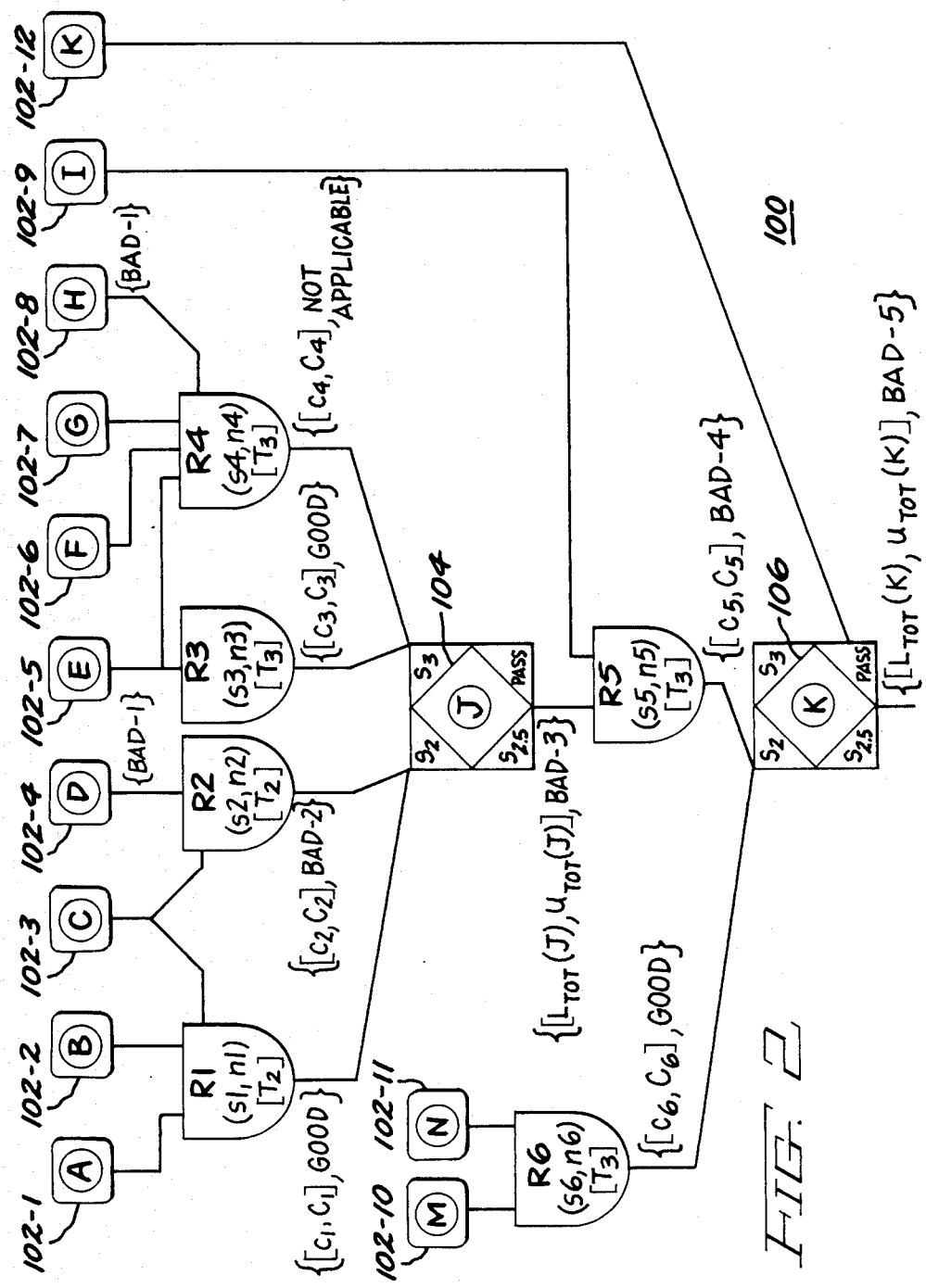
FIG. 2 is a rule deduction graph of an exemplary rule-based reasoning system practiced in accordance with the present invention.

In practicing a particular rule-based reasoning system in accordance with the present invention, the specific rules that represent the reasoning process to be performed and the variables associated with those rules are contained in a knowledge base portion of the system, as is typical of rule-based reasoning systems. FIG. 2 illustrates a deductive graph of an exemplary, automated rule-based reasoning system 100. System 100 comprises six rules designated R1 through R6. As is the case in such reasoning systems, each rule includes a premise, or antecedent, portion and a conclusion, or consequent, portion. Each rule premise consists of one or more "If"

clauses and one or more variables contained in each clause. A value must be assigned to each variable in order to evaluate the rule premise. Thus, FIG. 2 further illustrates a plurality of variables 102-1 through 102-11, represented as boxes, associated with the rules. The circled letter within each box, i.e. A, B, C, etc., symbolizes assignment of a value to the variable. In FIG. 2, variables are illustrated as utilized for two different purposes. Variables indicated as being applied to the top flat portion of a rule symbol, e.g. variables 102-1 and 102-2 applied to rule R1, are variables contained in the rule premise. Variables indicated as applied to the left or right side (as viewed in FIG. 2) of a rule symbol, e.g. variable 102-3 applied to rules R1 and R2, are available to the rule for determining the presence or absence of a context within which the rule may or may not be fired. This context limitation on rule firing feature is described in greater detail below.

A conclusion 104 to be drawn from the firing of one or more of the rules R1 through R4, in a manner more fully described below, is also indicated by a box. An exemplary value of the conclusion is indicated by the circled letter "J". Conclusion 104 is also seen to be an intermediate conclusion in system 100 and is, further, a variable in a premise clause of rule R5. A conclusion 106 is drawn from the firing of one or both of rules R5 and R6. An exemplary value of conclusion 106 is indicated by the circled letter "K". It is preferred herein that each rule be carried in the representation layer so as to be represented to the user, where the rule representation comprises the rule premise clauses, conclusion and firing context limitations.

In accordance with the present invention, a certainty interval is associated with each value of a variable, whether that variable is a conclusion, e.g. conclusions 104 or 106, or that variable is at the boundary of the reasoning system, e.g. variables 102-1 through 102-11. In the case of variables the values of which are determined by firing rules, e.g. conclusions 104 or 106, the respective certainty intervals of the values assigned to such variables are computed in a manner in accordance with the present invention, as more fully described below. With respect to the values of variables at the system boundary, the certainty interval for each is specifically designated a value certainty interval, such value certainty intervals being assigned on the basis of an understanding of the source of each value. Thus, upon initially configuring the rules and associated variables of the reasoning system, a qualitative assessment is made of the source of values for each variable and, based on each source assessment, a value certainty interval is determined for the values derived from the source. Some of qualitative, non-numerical information characterizing each source is also stored in the portion of the representation layer designated "Non-Numerical Meta-Information". Such information is characterized in FIG. 1 as "Source of Information" and "Source's Prior Credibility". This information is accessed by the control layer, as described hereinbelow, as part of that layer's function, referred to as calculus selection, of determining the nature of the computations performed by the inference layer.

The value certainty interval, having a value range of 0 to 1.0, has the form [a,A] where "a" and "A" are respectively the lower and upper bound for the certainty that the value assigned to the variable is believed to be true. FIG. 3 illustrates a representation of the value certainty interval on a 0 to 1.0 scale with exemplary values of 0.25 and 0.5 being illustrated for "a" and "A", respectively. The portion of the interval between 0 and the interval lower bound "a", hence the value "a", numerically represents the amount of confirmation of the truth of the value represented by the interval. The upper bound "A" numerically represents the failure of refutation of the truth of the value represented by the interval. The portion of the interval between the upper bound "A" and 1.0, i.e. 1-A, therefore represents the amount of refutation, or doubt, of the truth of the value. As an example, if there is absolute certainty that a particular value is true, then $a = A = 1.0$, while if there is absolute refutation of the value's truth, when $a = A = 0$. As a further example, the value "heads" assigned to a random coin toss result variable would be represented by a certainty interval for which $a = A = 0.5$, since there are equal amounts of confirmation and refutation of the value "heads".

The portion of the value certainty interval between "a" and "A" is designated the result interval and its breadth represents the amount of ignorance about the truth of the value. That is, the width of the result interval represents the extent to which the truth of the value can neither be confirmed nor refuted. For example, in the case where there is no confirmation and no refutation of the truth of the value, the interval [a,A] is [0,1]. Therefore, the result interval spans the entire value certainty interval and represents total ignorance about the truth of the value. As a further example, considering the above coin toss situation where for the value "heads" $[a,A] = [0.5, 0.5]$, there is no ignorance as to the certainty of the truth of the value. Referring again to FIG. 1, the confirmation and refutation of each value as determined from its value certainty interval is listed in a "Numerical Information" portion of the representation layer.

As stated above, the value certainty interval for each value is determined on the basis of information about the source of the value. For example, if the variable is a blood test result, the value certainty interval associated with the test result value would reflect experience with the reliability of previous test results. Note that some of this information may be appropriate for inclusion as "Non-Numerical Meta-Information" in the representation layer since it relates to the source's prior credibility. As a further example, if the variable is the distance of a target as determined by radar apparatus, the value certainty interval would reflect previous experience with the accuracy of the distances so determined as well as, e.g., malfunctions previously experienced with the apparatus that resulted in entirely false distance values. As can be seen, in many cases the selection of the value interval ultimately rests on a human assessment of prior experience and is therefore subjective. As is known in the art, in the case of constructing reasoning systems, such subjective assessments derive from extensive questioning of one or more experts. These subjective assessments can be elicited in either numerical or linguistic form. While the reasoning with uncertainty system of the present invention may be practiced with assessments of uncertainty elicited in either numerical or linguistic form, the latter is preferred herein. Linguistic assessment is preferred because of the observation that people more readily and consistently provide assessments in a qualitative form as opposed to a precise numerical form, this topic being discussed in the paper "Categorical and Probabilistic Reasoning in Medical Diagnosis" by P.

Szolovits et al., Artificial Intelligence Journal, Volume 11, 1978, pp. 115–144.

Having selected the use of linguistic assessment, it remains to specify the uncertainty granularity of the linguistic term set and whether crisp or fuzzy number representations are correlated to the linguistic assessments and used in the computations described hereinbelow. Uncertainty granularity as used herein refers to the number of linguistic terms used to describe the full range of possible assessments of confirmation or refutation. For example, the linguistic assessments at the extreme ends of such a range may be: "impossible" and "certain", while interim assessments may be: "unlikely" and "likely". Obviously, the greater the number of terms in the term set, the finer the uncertainty assessment granularity that can be achieved. Such term sets containing 5, 9 and 13 terms have been described in detail in the paper entitled "Selecting Uncertainty Calculi and Granularity: An Experiment in Trading-Off Precision and Complexity" by Bonissone et al., Uncertainty in Artificial Intelligence edited by L. Kanal and J. Lemmer, North-Holland, 1986, pp. 217–247, which is incorporated herein by reference. The reasoning with uncertainty system of the present invention is readily practiced with term sets having granularities such as disclosed in Bonissone et al.

Once the term set granularity is selected, the correlation of numerically crisp or fuzzy values to the linguistic terms remains. Correlations between numerical values of certainty and linguistic assessments are known in the art. Crisp as used herein and known in the art refers to the use of discrete numerical values to represent the subjective assessments. For example, the exemplary value certainty interval illustrated in FIG. 3 is defined in terms of crisp values of confirmation and refutation. Correlations between linguistic assessments and such crisp value representations are known, an exemplary system of five linguistic assessments and corresponding crisp numerical values being provided below in Table I.

TABLE I

| Linguistic Assessment | Crisp Numerical Value |
| --- | --- |
| impossible | 0 |
| unlikely | 0.25 |
| maybe | 0.50 |
| likely | 0.75 |
| certain | 1.0 |

The practice of the reasoning with uncertainty system of the present invention is initially described hereinbelow assuming the use of such crisp value representations of certainty intervals. In an alternate embodiment also described hereinbelow, the use of fuzzy number representations of the certainty intervals is described in detail.

Further in accordance with the present invention, uncertainty factors are associated with each rule. Specifically, a sufficiency factor "s" and a necessity factor "n" are determined at the time the system is designed based on available information, such as from the expert(s) providing input to the system design. The concepts of sufficiency and necessity will not be described in detail herein since they are well known in the art. Simply characterized, the sufficiency factor "s" is a numerical answer, or quantifiable linguistic assessment, or the interval [0,1], to the question: If the premise of the rule is true, how strongly is the conclusion of the rule believed to be true? The sufficiency factor "s" ranges from 0 to 1 as the answer ranges from no truth belief strength to absolute truth belief strength. The necessity factor "n" is the numerical answer, or quantifiable linguistic assessment, on the interval [0,1], to the question: If the premise of the rule is false, how strongly is the rule conclusion believed to be false? Thus, for $n=0$, there is no belief that the conclusion is false given the premise is false and, conversely, for $n=1$, there is absolute belief that the conclusion is false given the rule premise is false. Note that in eliciting values for "s" and "n" from an expert, the above questions are posed with the rule premise in each case hypothesized to be absolutely true or false. That is, in posing the question, there is no uncertainty attached to the rule premise. A value for "s" and "n" associated with each rule of exemplary reasoning system 100 is illustrated in FIG. 2 by the factors "s#" and "n#" for each rule R# for #=1 to 6. The sufficiency and necessity factors associated with each rule are contained in the system knowledge base and represented to the user in the system representation layer with the associated rule.

Having defined a value certainty interval for each value assigned to a variable at the system boundaries and having further defined a sufficiency and necessity factor for each rule, there remains a need for a conjunction operator and a disjunction operator. The conjunction operator is required for aggregating the value certainty intervals of the clauses of a rule premise and for determining the certainty interval of the conclusion of a rule in view of the sufficiency and necessity prescribed therefor (the latter determination being referred to hereinbelow as conclusion detachment). Given the situation where multiple rules assert the same conclusion, the disjunction operator is required to compute a certainty interval associated with the aggregation of those conclusions (referred to hereinbelow as a conclusion aggregation operation). Triangular norm and triangular conorm functions have been adapted for use herein as the conjunction and disjunction operators, respectively, and are collectively referred to herein as the uncertainty calculi. The triangular norm (T-norm) and triangulr conorm (T-conorm) functions are general families of binary functions that satisfy the requirements of the conjunction and disjunction operators, respectively. T-norms and T-conorms are two-place functions from $[0,1] \times [0,1]$ to $[0,1]$ that are monotonic, commutative and associative. Their corresponding boundary conditions, i.e. the evaluation of the T-norms and T-conorms at the extremes of the [0,1] interval, satisfy the truth tables of logical AND and OR operators. One parametrized family of T-norms and T-conorms described in the paper "Associative Functions and Abstract Semi-Groups" by Schweizer et al., Publications Mathematicae Debrecen, Volume 10, 1963, pp. 69–81 has been adapted for use in the reasoning with uncertainty system of the present invention. The family of T-norms described in that paper is denoted by $T_{Sc}(a,b,p)$ where the conjunctive function performed by the T-norm on the arguments "a" and "b" varies in accordance with the parameter "p". In varying parameter "p" from $-\infty$ to $\infty$, a set of six T-norms, most having utility in the practice of the present invention, is provided, those six T-norms $T_i(a,b)$ being designated $T_0$, $T_1$, $T_{1.5}$, $T_2$, $T_{2.5}$ and $T_3$. Generally, in accordance with equations (1a)–(1d) below:

$$T_{Sc}(a,b,p) = (a^{-p} + b^{-p} - 1)^{-1/p} \text{ if } (a^{-p} + b^{-p}) \geq 1 \quad \text{(1a)}$$
when $p < 0$ $$T_{Sc}(a,b,p) = 0 \quad \text{if } (a^{-p} + b^{-p}) < 1 \quad \text{(1b)}$$
when $p < 0$ $$T_{Sc}(a,b,0) = ab \quad \text{for } \lim_{p \to 0} T_{Sc}(a,b,p) \quad \text{(1c)}$$

$$T_{Sc}(a,b,p) = (a^{-p} + b^{-p} - 1)^{-1/p} \text{ when } p > 0 \quad \text{(1d)}$$

The six T-norms $T_0$, $T_1$, $T_{1.5}$ $T_2$, $T_{2.5}$ and $T_3$ correspond to the $T_{Sc}(a,b,p)$ of Schweizer et al. as a function of parameter p, and perform operations, as illustrated in the following Table II.

TABLE II

| Selected Value of p | $T_i(a,b)$ | Operation Performed By $T_i(a,b)$ |
|---|---|---|
| $\lim_{p \to -\infty} T_{Sc}(a,b,p)$ | $T_0(a,b)$ | = min (a,b) if max (a,b) = 1<br>= 0 otherwise |
| $T_{Sc}(a,b,-1)$ | $T_1(a,b)$ | max (0a + b − 1) |
| $T_{Sc}(a,b,-0.5)$ | $T_{1.5}(a,b)$ | max(0,$a^{0.5} + b^{0.5} - 1$)$^2$ |
| $\lim_{p \to 0} T_{Sc}(a,b,p)$ | $T_2(a,b)$ | ab |
| $T_{Sc}(a,b,1)$ | $T_{2.5}(a,b)$ | $(a^{-1} + b^{-1} - 1)^{-1}$ |
| $\lim_{p \to \infty} T_{Sc}(a,b,p)$ | $T_3(a,b)$ | min (a,b) |

Each T-norm operator $T_i(a,b)$ is a conjunction operator and satisfies the conditions:

| | |
|---|---|
| $T_i(0,0) = 0$ | [boundary condition] |
| $T_i(a,1) = T_i(1,a) = a$ | [boundary condition] |
| $T_i(a,b) \leq T_i(c,d)$ if $a \leq c$ and $b \leq d$ | [monotonicity condition] |
| $T_i(a,b) = T_i(b,a)$ | [commutativity condition] |
| $T_i(a,T_i(b,c)) = T_i(T_i(a,b),c)$ | [associativity condition] |

Although defined as a two place function, a T-norm can be used to represent the conjunction of a large number of clauses in a premise. Because of the associativity of the T-norms, it is possible to define recursively $T(x_1, \ldots, x_n, x_{n+1})$, for $x_1, \ldots, x_{n+1} \epsilon [0,1]$, as:

$T(x_1, \ldots, x_n, x_{n+1}) = T(T(x_1, \ldots, x_n), x_{n+1})$

In accordance with Schweizer et al., the T-conorm designated $S_{Sc}(a,b,p)$ is defined in equation (2) as:

$$S_{Sc}(a,b,p) = 1 - T_{Sc}(1-a, 1-b, p) \quad (2)$$

The T-conorm disjunction operator defined for use herein is simply $S_i(a,b)$ and is related to $T_i(a,b)$ in accordance with DeMorgan's Law as described in equations (3) and (4) as follows:

$$S_i(a,b) = N(T_i(N(a),N(b))) \quad (3)$$

$$T_i(a,b) = N(S_i(N(a),N(b))) \quad (4)$$

where N is the negation operator such that $N(\alpha) = 1-\alpha$. In view of this relationship between the T-norm operators $T_i$ and T-conorm operators $S_i$, programming of a reasoning system practiced in accordance with the present invention may be simplified by expressing all operators exclusively in terms of either the T-norm or T-conorm operators.

The operation performed by the T-conorms $S_i(a,b)$ and their correspondence to the T-conorms $S_{Sc}(a,b,p)$ of Schweizer et al. are summarized below in Table III.

TABLE III

| Selected Value of p | $S_i(a,b)$ | Operation Performed by $S_i(a,b)$ |
|---|---|---|
| $\lim_{p \to -\infty} S_{Sc}(a,b,p)$ | $S_0(a,b)$ | = max(a,b), if min(a,b) = 0<br>= 1 otherwise |
| $S_{Sc}(a,b,-1)$ | $S_1(a,b)$ | min(1, a+b) |
| $S_{Sc}(a,b,-0.5)$ | $S_{1.5}(a,b)$ | 1-max(0,$[(1-a)^{0.5} + (1-b)^{0.5} - 1])^2$ |
| $\lim_{p \to 0} S_{Sc}(a,b,p)$ | $S_2(a,b)$ | a + b − ab |
| $S_{Sc}(a,b,1)$ | $S_{2.5}(a,b)$ | $1 - [(1-a)^{-1} + (1-b)^{-1} - 1]^{-1}$ |
| $\lim_{p \to \infty} S_{Sc}(a,b,p)$ | $S_3(a,b)$ | max(a,b) |

As stated above, the T-conorm $S_i(a,b)$ is the disjunction operator and satisfies the conditions:

| | |
|---|---|
| $S_i(1,1) = 1$ | [boundary condition] |
| $S_i(0,a) = S_i(a,0) = a$ | [boundary condition] |
| $S_i(a,b) \leq S_i(c,d)$ if $a \leq c$ and $b \leq d$ | [monotonicity condition] |
| $S_i(a,b) \leq S_i(b,a)$ | [commutativity condition] |
| $S_i(a,S_i(b,c)) = S_i(S_i(a,b),c)$ | [associativity condition] |

A T-conorm can be extended to operate on more than two arguments in a manner similar to the extension for the T-norms. By using a recursive definition, based on the associativity of the T-conorms, it is possible to define:

$S_i(y_1, \ldots, y_m, y_{m+1}) = S_i(S_i(y_1, \ldots, y_m), y_{m+1})$ for $y_1, \ldots, y_{m+1} \epsilon [0,1]$. Together the T-norms and T-conorms compose the uncertainty calculi available for performing computations to propagate uncertainty through a reasoning system in accordance with the present invention.

The different T-norms that can be selected for the rule premise evaluation and conclusion detachment operations reflect different attitudes toward the evaluation of uncertainty. For example, with respect to premise evaluation, given a rule with two premise clauses each having a variable with an assigned value and associated value certainty interval, three different attitudes, defined herein, may be assumed toward the conjunction of the certainty intervals associated with the two values. A first attitude is that the two values are mutually exclusive of one another. The conjunction operation performed by the T-norm $T_1$ (See Table II) expresses the mutual exclusivity attitude. Such an attitude reflects a conservative approach to evaluating uncertainty. A second attitude is that the two values are independent of one another. The conjunction operation performed by T-norm $T_2$, which simply multiplies uncertainty values directly, reflects an attitude corresponding to probabilistic independence. A third attitude is that one of the two values entirely subsumes the other. The $T_3$ conjunction operation best reflects this attitude which corresponds to a relatively nonconservative attitude toward evaluating uncertainty. The same attitudes are applicable to the T-norm selection for the conclusion detachment operation. Note that for the embodiments of the present invention described herein, only the three T-norms $T_1$, $T_2$ and $T_3$ are utilized. The intermediate values $T_{1.5}$ and $T_{2.5}$ can be used to achieve a finer granularity in reflecting user attitude toward uncertainty evaluation. No utility is found in applying T-norm $T_0$ in the practice of the present invention due to its drastic behavior and lack of continuity.

A simple example is a now provided to further illustrate the nature of these attitudes toward uncertainty evaluation and their respective expressions through the T-norms $T_1$, $T_2$ and $T_3$. The problem posed is derived, in part, from "A Computational Approach to Fuzzy Quantifiers in Natural Languages" by Zadeh, Computer & Mathematics with Applications, Volume 9, No. 1, 1983, pp. 149-184. The example is stated as the problem. If 30% of the students in a college are engineers, and 80% of the students are male, how many students are both male and engineers? As can be seen, the answer may range in an interval between 10-30%. A lower bound to the answer is represented by the conservative, mutual exclusivity attitude and thus provided by $T_1(0.3, 0.8)$. Given the attitude of mutual exclusivity, only 10% of the students are concluded to be both engineers and male. Recall from Table II that $T_1(0.3, 0.8) = \max(0, 0.3 + 0.8 - 1) = 0.1$ At the other extreme, if the nonconservative subsumption attitude is taken, i.e. one value subsumes the other, then the answer is provided by $T_3(0.3, 0.8)$. That is, the 30% of students that are engineers are subsumed in the 80% that are male and the answer is 30%. Referring again to Table II, $T_3(a,b) = \min(a,b)$ so that $T_3(0.3, 0.8) = \min(0.3, 0.8) = 0.3$.

Finally, if the two values are considered independent of one another, reflecting an attitude that is intermediate the above two attitudes, a result that is intermediate the above two results is obtained by applying $T_2(0.3, 0.8)$. Again from Table II, $T_2(a,b) = ab$, so that $T_2(0.3, 0.8) = 0.3 \times 0.8 = 0.24$. The correlation between attitude toward uncertainty evaluation and T-norm is summarized below in Table IV.

TABLE IV

| T-Norm | Attitude Toward Uncertainty Evaluation |
|---|---|
| $T_1$ | Conservative-mutual exclusivity |
| $T_2$ | Intermediate-independence |
| $T_3$ | Nonconservative-subsumption |

Given the attitudes toward uncertainty correlated to the uncertainty calculi T-norms $T_1$, $T_2$ and $T_3$, the appropriate T-norms may be selected or adjusted by the system user in advance of system use. Additional utility may be realized where the user is optionally enabled to change the selected calculi during system operation. Alternatively, since the attitude toward uncertainty relating to the premise evaluation or conclusion detachment operations may be based on an assessment of information source credibility, the control layer may be progammed to select the appropriate uncertainty calculus for some such operations, for use by the inference layer, based on the non-numerical source credibility meta-information stored in the representation layer. The source credibility assessment is preferably based on a limited set of descriptive terms to enable such programming of the control layer.

With respect to the T-conorm disjunction operators, three in particular are selected as available for use herein in the conclusion aggregation operation. These three, $S_2$, $S_{2.5}$ and $S_3$ correspond to different attitudes toward the relation between the conclusions being aggregated. As noted above, the conclusion aggregation operation is performed when the same conclusion is provided by the firing of more than one rule and performs the disjunction of the certainty intervals associated with the respective conclusions. The conclusion aggregation operation determines the consolidated degree to which the conclusion is believed if supported by more than one rule. $S_2$ is used herein to perform the disjunction operation when there is a lack of correlation between the rules providing the same conclusion. Lack of correlation as used herein means that the rules provide their respective conclusions based on entirely independent, unrelated sources of information and/or reasoning. For example, if one rule reaches a particular medical diagnostic conclusion based on a blood test result, while another rule reaches the same diagnostic conclusion based on an electrocardiographic test result, the rules may be said to be uncorrelated. The disjunction operation is performed using $S_3$ for the opposite case in which correlated rules provide the same conclusion when those rules provide their respective conclusions based on the same or related sources of information. Using the above medical diagnostic example, if two rules reach the same diagnostic conclusion based on different results of the same blood test, then the rules may be said to be correlated. $S_{2.5}$ is used for situations deemed to fall between the two extremes addressed by use of the $S_2$ and $S_3$ disjunction operators.

As discussed above with respect to selection of T-norms, the appropriate T-conorms may be selected or adjusted by the user prior to system use. Further, given the non-numerical meta-information relating to the source of the information used for premise evaluation and rule firing, the control layer can be programmed to determine whether or not rules providing the same conclusion are correlated. On the basis of such a determination, the control layer can select the appropriate uncertainty calculus T-conorm for use by the inference layer in performing a conclusion aggregation operation.

Having defined value certainty intervals, sufficiency and necessity factors for each rule and conjunction and disjunction operators, the operations required to fire rules as well as aggregate common rule conclusions are described next. First, the process of rule premise evaluation is performed by computing a premise certainty interval designated [b,B]. The terms "b" and "B" are respectively the lower and upper bounds of the premise interval and are to be interpreted in the manner described with respect to the value certainty interval and illustrated in FIG. 2. Given a plurality of m clauses of the rule, i.e. m "If" statements, and a value assigned to a variable associated with each clause such that there are m value certainty intervals $[a_1, A_1]$ through $[a_m, A_m]$, then the premise certainty interval is defined as:

$$[b,B] = [T_i(a_1, a_2, \ldots, a_m), T_i(A_1, A_2, \ldots, A_m)] \quad (5)$$

As described above, the appropriate uncertainty calculus $T_i$ will have been selected, by the user or the control layer, to reflect an appropriate attitude toward uncertainty evaluation.

Next, the conclusion detachment operation is performed, this operation being the actual firing of the rule. The conclusion detachment operation yields a certainty interval designated the conclusion detachment interval [c,C] and defined as:

$$[c,C] = [T_i(s,b), N(T_i(n,N(B)))] \quad (6)$$

where "s" and "n" are respectively the rule sufficiency and necessity factors described above, "b" and "B" are respectively the lower and upper bounds of the premise certainty interval calculated in equation (5) and N is the negation operator (i.e. $N(\alpha)=1-\alpha$). The $T_i$ employed to fire each rule will have been selected by the user or the control layer to reflect the attitude toward uncertainty evaluation associated with firing that rule. In FIG. 2, a particular $T_i$ has been indicated for firing each of the rules R1 through R6. For example, the $T_3$ operator is noted for rule R4. The conclusion detachment interval [c,C] is interpreted for the rule conclusion in the same manner as the value certainty and premise certainty intervals.

The above described conclusion aggregation operation would next be performed as the disjunction operation on identical conclusions provided by different rules. In FIG. 1, rules R3 and R4 provide the same conclusion and conclusion aggregation is performed thereon using the $S_3$ operator. Similarly, rules R1 and R2 provide the same conclusion and the $S_2$ operator is selected to perform conclusion aggregation on those conclusions. As stated above, the selection, by the user or control layer, of the particular uncertainty calculus $S_i$ to perform conclusion aggregation reflects an attitude with respect to whether or not the rules providing the same conclusion are correlated. Performance of conclusion aggregation yields a certainty interval designated the conclusion aggregation interval [d,D] and defined as:

$$[d,D] = [S_i(c_1,c_2,\ldots,c_m), S_i(C_1,C_2,\ldots,C_m)] \quad (7)$$

where $[c_1,C_1]$ through $[c_m,C_m]$ are m conclusion detachment intervals corresponding to the same conclusion reached by m different rules.

In the process of initially configuring the rules, and conclusions derived therefrom, in a rule based system, it may be desirable to introduce a conclusion without subjecting it to the conclusion aggregation operation. Such a conclusion may derive from a source external to the system or from a rule firing within the system. This is accomplished by a "pass" function which simply operates to isolate the conclusion introduced thereby from the conclusion aggregation operation. This is illustrated in FIG. 2 with respect to conclusion 106 where a value "K" of a variable 102-12 at the system boundary is provided as input to determining conclusion 106 via the pass function. Therefore, while the conclusions provided by rules R5 and R6 are subjected to conclusion aggregation using the $S_2$ operator, the conclusion provided via the pass function is isolated from this operation. The "pass" function is associated, in the knowledge base, with the rule conclusion or variable being "passed" and this association is represented to the user in the representation layer.

If a conclusion is provided by the firing of only a single rule or if but a single conclusion aggregation operation is required to aggregate identical conclusions, then a conclusion is reached having a certainty interval given by the conclusion detachment interval or conclusion aggregation interval, respectively. However, in cases where the same conclusion is reached through more than one conclusion aggregation operation, as is the case of conclusion 104, and/or through introduction of the same conclusion through the pass function, as in the case of conclusion 106, a single certainty interval is not associated with the conclusion. In such a case, an additional source consensus operation is performed. The source consensus operation reduces the ignorance about the certainty of the conclusion by producing a source consensus interval that is always smaller than or equal to the smallest interval given by the separate sources providing the conclusion. Given a particular conclusion value Q that is reached by way of one or more conclusion aggregation operations and/or one or more pass functions, each source so providing the conclusion also provides a certainty interval associated therewith. Where there are m such certainty intervals, they may be generically represented as: $[L_1(Q),U_1(Q)]$, $[L_2(Q),U_2(Q)],\ldots,[L_m(Q),U_m(Q)]$, where $L_i(Q)$ and $U_i(Q)$ are respectively the lower and upper bounds of the certainty interval for the conclusion Q. The result of performing the source consensus operation is designated $[L_{tot}(Q),U_{tot}(Q)]$ and is determined by:

$$[L_{tot}(Q),U_{tot}(Q)] = [\text{Max } L_i(Q), \text{Min } U_i(Q)] \quad (8)$$

for $i=1,2,\ldots,m$. Thus, it is seen that the source consensus operation simply takes the intersection of the respective certainty intervals provided by the plural sources of the conclusion Q.

It is noted that the multiple sources contributing to a conclusion need not provide the same conclusion. For example in FIG. 2, the aggregated conclusion derived from rules R1 and R2 may be entirely different from that derived from rules R3 and R4. For such a case, the control layer of the reasoning system of the present invention is programmed to select the rule having the certainty interval with the greatest amount of confirmation.

FIGS. 4a, 4b and 4c illustrate a brief numerical example of the above described computations to determine the premise certainty and conclusion detachment intervals. In each of FIGS. 4a-4c, rule R1 is shown with values "A" and "B" assigned to variables 102-1 and 102-2 respectively. Also in each FIG. 4a-4c, the value certainty intervals [0.5,0.6] and [0.7,0.9] are assigned to values "A" and "B", respectively. The same sufficiency and necessity factors s1=0.7 and n1=0.2 are also indicated for rule R1 in FIGS. 4a-4c. A different T-norm operator $T_1$ is shown in each FIGS. 4a, 4b, and 4c to indicate that $T_1$, $T_2$ and $T_3$ are respectively used in those Figures to determine both the premise certainty interval and the conclusion detachment interval.

Proceeding with the numerical example, referring to FIG. 4a, with the value certainty interval for the values of variables 102-1 and 102-2 being respectively designated $[a_1,A_1]$ and $[a_2,A_2]$, the premise certainty interval [b,B] is determined by applying the above described equation (5):

$$[b,B] = [T_1(a_1,a_2),T_1(A_1,A_2)].$$

Substituting the numerical values shown in FIG. 1 provides:

$$[b,B] = [T_1(0.5,0.7), T_1(0.6,0.9)]$$

Referring to Table II for the definition of $T_1$, to wit $T_1(a,b) = \max(0,a+b-1)$, premise certainty interval [b,B] is determined to be:

$$[b,B] = [0.2, 0.5]$$

this result being indicated in a box 400 in FIG. 4a.

Next, the conclusion detachment interval [c,C] is determined for rule R1 in FIG. 4a. Using equation (6) above to determine the conclusion detachment interval in this case, yields:

$$[c,C]=[T_1(s1,b),N(T_1(n1,N(B)))]$$

Substituting the appropriate numerical values into this equation results in:

$$[c,C]=[T_1(0.7,0.2),N(T_1(0.2,N(0.5)))]$$

and by evaluating this expression, $[c,C]$ is determined to be:

$$[c,C]=[0,1],$$

this result being indicated in a box 402 in FIG. 4a.

The computations for application of the T-norms $T_2$ and $T_3$ in FIGS. 4b and 4c, respectively, are not described in detail herein. However, the computational results for the premise evaluation and conclusion detachment intervals are respectively shown in boxes 404 and 406 in FIG. 4b and respectively shown in boxes 408 and 410 in FIG. 4c. In reviewing the computed conclusion detachment intervals in FIGS. 4a–4c, it is noted that as $T_i$ ranges from $T_1$ to $T_3$, respectively representing an attitude toward uncertainty evaluation ranging from conservative to nonconservative (Table IV), the ignorance of the interval decreases while the amount of confirmation increases. It is thereby illustrated that use of the $T_1$ operator reflects a conservative attitude in evaluating uncertainty while $T_3$ reflects a relatively nonconservative attitude. In view of the numerical example illustrated in FIGS. 4a, 4b and 4c, the performance of the other computations required in order to practice the present invention should now be readily apparent to those skilled in the art.

Two additional items of information are maintained in the representation layer as numerical meta-information. The first item is designated an "ignorance measure" (FIG. 1) and is simply the computed difference between the upper and lower bound of each certainty interval. As discussed with respect to the value certainty interval, that difference reflects the ignorance gap between the confirmation and refutation known about the value. Thus, an ignorance measure is maintained for each value certainty, premise certainty, conclusion detachment, conclusion aggregation and source consensus interval.

The second item also maintained in the representation layer is a "consistency measure" (FIG. 1) which assesses the result of each source consensus operation. In performing the latter operation, it is possible that there is no certainty interval that represents the intersection of the respective certainty intervals of the conclusions, i.e. there is no consistency among the respective certainty intervals of those conclusions. Such an absence of consistency among conclusions is referred to herein as the existence of "conflict". Thus, the consistency measure simply reflects the presence or absence of conclusion consistency. With respect to both the ignorance and consistency measures, the user is enabled to quickly assess those important characteristics of the rule-based reasoning process being conducted.

In addition to performing calculus selection as described above, the control layer performs additional functions. One of these additional functions, indicated in FIG. 1, is designated "ignorance resolution". Given the computed ignorance measure described above, the user may deem it undesirable to perform a computation with one or more values the ignorance measure of which exceeds some arbitrary predetermined amount. Therefore, the control layer may be programmed to exclude from a computation a value the ignorance of which exceeds the predetermined amount, e.g. exclude a conclusion from a conclusion aggregation or source consensus operation, or not perform a computation at all where the value having excessive ignorance is essential to the computation performance. An example of the latter case is premise evaluation where one variable value having excessive ignorance would prevent evaluation of a clause of a rule premise. In such cases where performance of the computation is otherwise prevented, it may nevertheless be desirable to proceed in spite of the ignorance. To resolve such ignorance related problems, the control layer may be programmed to prompt the user for a decision on such matters. The user may be thereby afforded the opportunity to substitute a different value, presumably having an acceptable ignorance associated therewith, for the excessively ignorant value.

The control layer also performs a function designated "conflict resolution" (FIG. 1). As described above, the term "conflict" is used herein to describe the situation in which there is an absence of consistency between conclusions. Given such conflict, the control layer can be programmed to follow strategies to eliminate, and thereby resolve, the conflict. For example, given N conclusions respectively having N certainty intervals which are in conflict, each subset of N-1 intervals may be subjected to the source consensus operation and the smallest certainty interval from amongst those operations adopted as the result. Further, where consideration of the N-1 interval subsets fails to resolve the conflict, subsets of N-2, N-3, etc., intervals may be considered in turn until resolution is achieved. As a further example, other strategies may be programmed for conflict resolution based on a prioritization of the sources from which the conflicting conclusions derive. Additionally, the control layer may simply be programmed to apprise the user of the conflict, so that the user may take appropriate action to resolve the conflict.

The control layer further performs a function designated "belief revision" (FIG. 1). In performing this function, the control layer computes flag values for each existing certainty interval and the computed flag appears with its associated certainty interval in the representation layer. The flag values are computed by the control layer to reflect the status of a value assigned to a variable or conclusion. The appearance of the flags in the representation layer is non-numerical meta-information designated "logical support" in FIG. 1. Flags having values "good", "bad-level i", "inconsistent", "not applicable" and "ignorant" can be computed as part of the control layer belief revision function. The "good" flag indicates the validity of the certainty interval of an individual rule conclusion (conclusion detachment interval), a conclusion derived from a conclusion aggregation operation (conclusion aggregation interval) or a conclusion derived from a source consensus operation (source consensus interval). Each such certainty interval is assessed to be valid so long as no change occurs in the certainty intervals and/or variable values used in its computation.

The "bad-level i" flag is attached to a certainty interval determined to no longer be "good". The "bad-level i" flag is, therefore, a validity assessment that may be applied to any of the certainty intervals described above with respect to the "good" flag as well as to the certainty interval for each variable at the system boundary. The level "i" in the deduction process at which the certainty interval deemed "bad" resides, and which should therefore be recomputed, is appended to the "bad" flag. For example, referring to FIG. 2, subsequent to performing the computations resulting in conclusion values "J" and "K", the value "D" assigned to the variable 102-4 changes by at least an amount determined to cast doubt on the validity on the conclusion detached from rule R2. As a result, the "bad-1" flag is attached to variable 102-4 and its certainty interval, the "1" reflecting that the change of information occurred at level 1 of the deduction process. A "bad" validity assessment is passed by inheritance down through the rule deduction graph so that a bad-2 flag is attached to conclusion detachment interval $[c_2, C_2]$ of rule R2, a bad-3 flag is attached to the source consensus interval $[L_{TOT}(J), U_{TOT}(J)]$ of conclusion value "J", a bad-4 flag is attached to conclusion detachment interval $[c_5, C_5]$ of rule R5 and a bad-5 flag is attached to the source consensus interval $[L_{TOT}(K), U_{TOT}(K)]$ of conclusion value "K".

The "inconsistent" flag (not illustrated in FIG. 2) is attached to a conclusion value for which a conflict exists, where the term "conflict" is as described hereinabove.

As previously noted, the values of variables may be used as input to rules to determine whether an appropriate context exists for firing a rule. As an example of context limitation, consider a rule used by a surface-ship for identifying submarines. The rule is based on the characteristics of a surface-radar sensor and the earth's curvature. The surface-radar's horizon is limited by the earth's curvature to a range of approximately 20 nautical miles. Therefore, any surface-ship detected by surface-radar would first be reported at a range of approximately 20 miles, as the detected surface-ship appears on the horizon. The only way in which a first report could occur at a closer range is if the detected object were to emerge from the surface at a closer distance, i.e. what is referred to as a "close-distance radar pop-up". Aside from abnormal weather conditions, sensor malfunctions, etc., the rule is plausible since it provides the correct conclusion most of the time. The plain English version of the rule would state: "Assuming that a surface-radar was used to generate a sensor report, if the first time that the object was detected the object was located at a distance of less than 20 miles from our radar, then it is most likely that it is a submarine. Otherwise, there is a small chance that it is not a submarine." This rule would be subject to a context limitation such that it would only be fired if the source of the initially observed object distance is the surface-radar. Such a context limitation can be modeled as a variable designated "sensor source of initially observed object distance", that would be associated with the rule. The value assigned to that variable would then have to be evaluated in order to determine whether or not to fire the rule.

Having described an example of context limitation, it is further noted that in accordance with the belief revision function of the control layer, a "not applicable" flag is attached to the conclusion detachment interval of a rule conclusion when the context input to that rule changes such that the firing of the rule is no longer appropriate. This is illustrated in FIG. 2 where the value "H" of variable 102-8, which is a context input to rule R4, has changed since the firing of that rule. As a result of that change, a "bad-1" flag is attached to the variable 102-8 value certainty interval and a "not applicable" flag is attached to the conclusion detachment interval $[c_4, C_4]$ of rule R4. The "not applicable" flag is propagated down the rule deduction graph, by inheritance, resulting in attachment of "bad" flags at the inheriting levels. Thus, bad flags would be attached to the certainty intervals associated with conclusion value "J", the rule R5 conclusion and conclusion value "K" even in the absence of the exemplary change in variable 102-4 described above.

The control layer additionally regulates the context mechanism described hereinabove, this function also being noted in FIG. 1. In this regard, the control layer assures that rules subject to context constraints are only fired given the appropriate context. It is noted that the context mechanism improves the efficiency of practicing a reasoning system in accordance with the present invention in that inappropriate rule firings are avoided.

While the examples of certainty intervals shown hereinabove and the computations performed therewith using the uncertainty calculi were carried out with crisp number representations, the invention is not so limited. As stated above, linguistic term sets for assessing uncertainty can be correlated to fuzzy number representations. One such fuzzy number representation is described in detail in "A Fuzzy Sets Based Linguistic Approach: Theory and Applications" by Bonissone, Proceedings of the 1980 Winter Simulation Conference (T. I. Oren, C. M. Shub and P. F. Roth, Eds.) Orlando, Fla., December 1980, pp. 99–111, which is incorporated herein by reference. In that fuzzy number representation scheme, each linguistic assessment is correlated to a four parameter numerical assessment (a, b, $\alpha$, $\beta$). The four parameter assessment serves to associate a numerical interval with each linguistic uncertainty term rather than a crisp, discrete numerical value. FIG. 5 illustrates the numerical interval defined by the four parameters a, b, $\alpha$ and $\beta$. In this manner, the fuzzy number representing each certainty value, i.e. lower or upper bound of the certainty interval, is characterized by a membership function as defined by the set of parameters (a, b, $\alpha$, $\beta$). Thus, in the interval between "a" and "b", the membership function value is 1.0. The parameters "$\alpha$" and "$\beta$" define the width of the function respectively to the left and right of the "a" and "b" parameters. A linear function is assumed to define the slopes to the left and right of the "a" and "b" parameters. It is noted that the "a" and "b" parameters as used here in the fuzzy number representation bear no relation to the use herein of "a" and "b" in the value certainty and premise certainty intervals.

Table V, below, lists the linguistic assessments of a nine term linguistic set and the fuzzy number interval associated with each term.

TABLE V

| Linguistic Assessment | Fuzzy Interval (a, b, $\alpha$, $\beta$) |
| --- | --- |
| impossible | (0, 0, 0, 0) |

TABLE V-continued

| Linguistic Assessment | Fuzzy Interval (a, b, α, β) |
| --- | --- |
| extremely unlikely | (.01, .02, .01, .05) |
| very low chance | (.1, .18, .06, .05) |
| small chance | (.22, .36, .05, .06) |
| it may | (.41, .58, .09, .06) |
| meaningful chance | (.63, .80, .05, .06) |
| most likely | (.78, .92, .06, .05) |
| extremely likely | (.98, .99, .05, .01) |
| certain | (1, 1, 0, 0) |

FIG. 6 is a graphical illustration of the fuzzy number interval associated with each linguistic term of the nine term set illustrated in Table V. Note that the abscissa of the graph in FIG. 6 is the interval range [0,1.0] on which the lower and upper bounds of certainty intervals are defined. The ordinate of the graph is the above-described membership function used to characterize each fuzzy number. As an example of a certainty interval represented by fuzzy numbers, FIG. 7 graphically illustrates a certainty interval for which the lower bound (confirmation) is linguistically characterized by "small chance" and the upper bound (failure of refutation) is linguistically characterized by "extremely likely".

It remains to define the various operations required by the T-norm and T-conorm functions in terms of the fuzzy number representations. It is noted that a crisp number "e" can be represented as a fuzzy number (e,e,O,O). As a result, a certainty interval [e,f] represented by crisp numbers "e" and "f" could be represented by fuzzy numbers as [(e,e,O,O), (f,f,O,O)]. Appendix I to this specification lists the various arithmetic operations required hereinabove (Tables II and III) to be performed in accordance with the T-norms and T-conorms, as they would be performed with four parameter fuzzy numbers as defined herein.

The reasoning with uncertainty system of the present invention is preferably implemented in software by the use of a structured object (or frame or unit) programming language to represent the variables used in the problem domain, their respective properties, the rules that refer to these variables in their contexts, premises or conclusions, and the topology of the rule graph. The structured object (or frame or unit) language should provide standard inheritance capabilities such that selected properties of each object can be transferred to the object instances. Either existing shell systems, such as the KEE system available from IntelliCorp of Mountain View, CA, or ART system available from Inference Corporation of Los Angeles, CA, or existing object-oriented languages, such as Symbolics Flavors or Common Loops, are adequate to implement the reasoning with uncertainty system of the present invention. The inventive system may be practiced on a variety of computer types, such as a Sun workstation as manufactured by Sun Microsystems, Inc. of Mountain View, CA or a Symbolics LISP machine as manufactured by Symbolics, Inc. of Concord, MA.

It is preferred herein to modularize the software implementation of the inventive reasoning with uncertainty system in order to facilitate its preparation. Appendix II to this specification provides a list of software file modules that comprise a preferred structure for an efficient software implementation of the present invention.

As indicated above, the reasoning with uncertainty of the present invention is intended for implementation in an automated rule-based reasoning system. As such, it is understood that the overall system would include all of the standard features of an automated rule-based reasoning system, including a forward and backward rule-chaining capability, in addition to the reasoning with uncertainty features described hereinabove.

While a particular set of T-norm and T-conorm functions derived from Schweizer et al. have been adapted for use in the embodiment of the present invention illustrated and described hereinabove, the invention is not so limited. Other families of T-norm and T-conorm functions, different than those of Schweizer et al., are known in the art and may be adapted for utility in the practice of the reasoning with uncertainty system of the present invention.

While a preferred embodiment has been illustrated and described herein, it will be obvious that numerous modifications, changes, variations, substitutions and equivalents, in whole or in part will now occur to those skilled in the art without departing from the spirit and scope contemplated by the invention. Accordingly, it is intended that the invention herein be limited only be the scope of the appended claims.

APPENDIX I

Assume two fuzzy numbers $\tilde{m}$ and $\tilde{n}$, where:
$\tilde{m}$ (a,b,α,β)
$\tilde{n}$ (f,g,γ,δ)

| Arithmetic Operation | Result | Applicable Condition |
| --- | --- | --- |
| $\tilde{m} + \tilde{n}$ | (a + f, b + g, α + γ, β + δ) | all $\tilde{m}, \tilde{n}$ |
| $\tilde{m} - \tilde{n}$ | (a − g, b−f, α + δ, β + γ) | all m, n |
| m × n | (af, bg, aγ + fα − αγ, bδ + gβ + βδ) | $\tilde{m} > 0, \tilde{n} > 0$ |
|  | (ag, bf, gα − αδ + αδ, −bγ + fβ − βγ) | $\tilde{m} < 0, \tilde{n} > 0$ |
|  | (bf, ag, bγ − fβ + βγ, −gα + αδ − αδ) | $\tilde{m} > 0, \tilde{n} < 0$ |
|  | (bg, af, −bδ − gβ − βδ, −aγ − fα + αγ) | $\tilde{m} < 0, n < 0$ |
| $\widetilde{mn}$ | ($a^f, b^g, a^f − (a − α)^{f−\gamma}, (b + β)^{g+δ} − b^g$) | m∈[1,∞)  $\tilde{n} > 0$ |
|  | ($b^f, a^g, b^f − (b + β)^{f−\gamma}, (a − α)^{g+δ} − a^g$), | m∈[1,∞)  $\tilde{n} < 0$ |
|  | ($a^g, b^f, a^g − (a − α)^{g+δ}, (b + β)^{f−\gamma} − b^f$) | m∈[0,1]  $\tilde{n} > 0$ |
|  | ($b^g, a^f, b^g − (b + β)^{g+δ}, (a −α)^{f−\gamma} − a^f$), | m∈[0,1]  n < 0 |

Note: The "Applicable Conditions" described immediately above refer to the sign of a fuzzy number. A fuzzy number m ≙ (a,b,α,β) is positive, i.e. m > 0, if its support is positive (i.e., a − α ≧ 0 if -continued $\alpha = 0$ or $a - \alpha > 0$ if $a = 0$). Analogously, $\tilde{m} < 0$ implies that its support is negative (i.e., $b + \beta \leq 0$ if $\beta = 0$ or $b + \beta < 0$ if $\beta = 0$).

Determination of Maximum and Minimum $$MAX\ (\tilde{m}, \tilde{n}) = (\max(a,f), \max(b,g), q, r)$$

| | | | |
|---|---|---|---|
| if $(b + \beta) > (g + \delta)$ | $r = (b + \beta) - \max(b,g)$ | | |
| if $(b + \beta) < (g + \delta)$ | $r = (g + \delta) - \max(b,g)$ | | |
| if $(b + \beta) = (g + \delta)$ | $r = \begin{cases} \beta \\ \delta \\ \beta = \delta \end{cases}$ | | if $b > g$<br>if $b < g$<br>if $b = g$ |
| if $(a - \alpha) > (f - \gamma)$ | $q = (f + \alpha) - \min(a,f)$ | | |
| if $(a - \alpha) < (f - \gamma)$ | $q = (a + \gamma) - \min(a,f)$ | | |
| if $(a - \alpha) = (f - \gamma)$ | $q = \begin{cases} \alpha \\ \gamma \\ \alpha = \gamma \end{cases}$ | | if $a > f$<br>if $a < f$<br>if $a = f$ |

$$MIN\ (\tilde{m}, \tilde{n}) = (\min(a,f), \min(b,g), q, r)$$

| | | | |
|---|---|---|---|
| if $(b + \beta) > (g + \delta)$ | $r = (g + \delta) - \min(b,g)$ | | |
| if $(b + \beta) < (g + \delta)$ | $r = (b + \beta) - \min(b,g)$ | | |
| if $(b + \beta) = (g + \delta)$ | $r = \begin{cases} \delta \\ \beta \\ \delta = \beta \end{cases}$ | | if $b > g$<br>if $b < g$<br>if $b = g$ |
| if $(a - \alpha) > (f - \gamma)$ | $q = (a + \gamma) - \max(a,f)$ | | |
| if $(a - \alpha) < (f - \gamma)$ | $q = (f + \alpha) - \max(a,f)$ | | |
| if $(a - \alpha) = (f - \gamma)$ | $q = \begin{cases} \gamma \\ \alpha \\ \gamma = \alpha \end{cases}$ | | if $a > f$<br>if $a < f$<br>if $a = f$ |

APPENDIX II

| Module | Module Content |
|---|---|
| Fuzzy Arithmetic | A file containing all formulas used to perform arithmetic operations with fuzzy numbers, i.e. the fuzzy number formulas appearing in Appendix I of this specification. The file also contains the definitions of the T-norm and T-conorm functions as illustrated in Tables II and III hereinabove. The fuzzy number formulas enable implementation of the T-norm and T-conorm functions with fuzzy numbers. |
| Linguistic Terms | A file containing the numerical definitions of all linguistic elements of the term sets used to provide linguistic assessments of uncertainty (e.g. Table V). |
| Predicates | A file containing all of the predicates required to define tests in the clauses of the rule premises |
| Data Structure | A file containing the most common data structures with their own internal accessing functions. For example, the recurrent data structure triple (value, lower-bound, upper-bound). |
| Rules Handling | A file containing the functions that evaluate the rule context, rule premise and rule conclusion. Such functions determine if the rule is applicable given the current context and compute the premise certainty and conclusion detachment intervals. |
| Formula Handling | A file containing functions that search for the rules relevant to a conclusion being determined, the functions for computing the conclusion aggregation and source consensus intervals and a function for selecting the best conclusion on the basis of its certainty interval. |
| Rule Chaining | A file containing the functions that initiate and control the forward and backward chaining process as well as the propagation of flags caused by changes in input data. |
| User Interface | A file containing the functions that allow the user to communicate with the reasoning system via menu and mouse interaction. |

What is claimed is:

1. A method, for practice on a computer, for reasoning with uncertainty in a rule-based reasoning system comprising a plurality of rules each having a premise and a conclusion to be determined true upon finding the premise to be true, said premise comprising at least one clause including a variable to which a value can be assigned, said method comprising the steps of:

associating a value certainty interval with each value assigned to one of said rule premise variables, said value certainty interval having a lower and an upper bound respectively representative of amounts of confirmation and failure of refutation of the assigned value;

associating a sufficiency factor and a necessity factor with each said rule, said sufficiency factor representing a strength of belief that the rule conclusion is true given the rule premise is true, said necessity factor representing a strength of belief that the rule conclusion is false given the rule premise is false;

computing a premise certainty interval from the value certainty intervals respectively associated with the values assigned to the premise variables, a lower bound of said premise certainty interval being a first predetermined function of the respective value certainty interval lower bounds, an upper bound of said premise certainty interval being said first function of the respective value certainty interval upper bounds; and firing one of said rules by computing a conclusion detachment certainty interval having a lower and an upper bound, said conclusion detachment interval lower bound being a second predetermined function of both said rule sufficiency factor and said premise certainty interval lower bound, the conclusion detachment upper bound being a third predetermined function of both said rule necessity factor and said premise certainty interval upper bound, said conclusion detachment interval lower and upper bounds respectively representing the amounts of confirmation and failure of refutation of the rule conclusion.

2. A method, for practice on a computer, for reasoning with uncertainty in a rule-based reasoning system comprising a plurality of rules each having a premise and a conclusion to be determined true upon finding the premise to be true, said premise comprising at least one clause including a variable to which a value can be assigned, said method comprising the steps of:

associating a value certainty interval with each value assigned to one of said rule premise variables, said value certainty interval having a lower and an upper bound respectively representative of amounts of confirmation and failure of refutation of the assigned value;

associating a sufficiency factor and a necessity factor with each said rule, said sufficiency factor representing a strength of belief that the rule conclusion is true given the rule premise is true, said necessity factor representing a strength of belief that the rule conclusion is false given the rule premise is false;

computing a premise certainty interval from the value certainty intervals respectively associated with the values assigned to the premise variables, a lower bound of said premise certainty interval being a first predetermined function of the respective value certainty interval lower bounds, an upper bound of said premise certainty interval being said first function of the respective value certainty interval upper bounds; and firing one of said rules by computing a conclusion detachment certainty interval having a lower and an upper bound, said conclusion detachment interval lower bound being a second predetermined function of both said rule sufficiency factor and said premise certainty interval lower bound, the conclusion detachment upper bound being a third predetermined function of both said rule necessity factor and said premise certainty interval upper bound, said conclusion detachment interval lower and upper bounds respectively representing the amounts of confirmation and failure of refutation of the rule conclusion, wherein upon the same conclusion being provided by more than one rule in a predetermined group of said rules, said method comprises the additional step of:

aggregating the same conclusions by computing a conclusion aggregation certainty interval having a lower bound that is a fourth predetermined function of the conclusion detachment interval lower bounds respectively computed for the rules reaching the same conclusion, an upper bound of said conclusion aggregation interval being said fourth predetermined function of the conclusion detachment interval upper bounds respectively computed for the rules reaching the same conclusion, said conclusion aggregation interval lower and upper bounds respectively representing the amounts of confirmation and failure of refutation of the aggregated conclusion.

3. The reasoning with uncertainty method of claim 2 wherein upon computing a plurality of said conclusion aggregation intervals for the same conclusion, said method comprises the additional step of:

computing a source consensus certainty interval by taking the intersection of said plurality of conclusion aggregation intervals.

4. The reasoning with uncertainty method of claim 2 including the additional steps of:

excluding a selected conclusion from said aggregating step even though said selected conclusion is the same as the aggregated conclusion, said selected conclusion having an associated certainty interval; and computing a source consensus certainty interval by taking the intersection of the associated certainty interval of said selected conclusion with each said conclusion aggregation interval computed for the same conclusion as said selected conclusion.

5. The reasoning with uncertainty method of claim 1 wherein said value uncertainty, premise certainty and conclusion detachment intervals are defined on an interval [0,1.0];

said premise certainty interval being computed in accordance with the equation:

$$[b,B] = [T_i(a_1, a_2, \ldots, a_m), T_i(A_1, A_2, \ldots, A_m)]$$

where:

[b,B] is said premise certainty interval;

$[a_1, A_1], [a_2, A_2], \ldots, [a_m, A_m]$ are m said value certainty intervals associated with the values assigned to the premise variables; and $T_i$ is a triangular norm (T-norm) function selected from a first function set comprising the predetermined T-norm functions $T_1$, $T_2$ and $T_3$; and said conclusion detachment interval being computed in accordance with the equation:

$$[c,C] = [T_i(s,b), N(T_i(n, N(B)))]$$

where:

[c,C] is said conclusion detachment interval;

$T_i$ is the T-norm function selected from said first function set;

s is said rule sufficiency factor;

n is said rule necessity factor;

[b,B] is said premise certainty interval; and

N is a negation operator such that $N(\alpha) = 1 - \alpha$.

6. The reasoning with uncertainty method of claim 5 wherein each said T-norm function $T_i$ is selected from said first function set in accordance with an attitude toward uncertainty evaluation;

the T-norm function $T_1$ corresponding to a conservative attitude toward uncertainty evaluation;

the T-norm function $T_2$ corresponding to an intermediate attitude toward uncertainty evaluation; and the T-norm function $T_3$ corresponding to a nonconservative attitude toward uncertainty evaluation.

7. The reasoning with uncertainty method of claim 2 wherein said value certainty, premise certainty, conclusion detachment and conclusion aggregation intervals are defined on an interval [0,1.0];

said premise certainty interval being computed in accordance with the equation:

$$[b,B] = [T_i(a_1, a_2, \ldots, a_m), T_i(A_1, A_2, \ldots, A_m)]$$

where:
[b,B] is said premise certainty interval;
$[a_1,A_1], [a_2,A_2], \ldots, [a_m,A_m]$ are m said value certainty intervals associated with the values assigned to the premise variables; and
$T_i$ is a triangular norm (T-norm) function selected from a first function set comprising the predetermined T-norm functions $T_1$, $T_2$ and $T_3$;
said conclusion detachment interval being computed in accordance with the equation:

$$[c,C] = [T_i(s,b), N(T_i(n, N(B)))]$$

where:
[c,C] is said conclusion detachment interval;
$T_i$ is the T-norm function selected from said first function set;
s is said rule sufficiency factor;
n is said rule necessity factor;
[b,B] is said premise certainty interval; and
N is a negation operator such that $N(\alpha) = 1 - \alpha$; and
said conclusion aggregation interval being computed in accordance with the equation:

$$[d,D] = [S_i(c_1, c_2, \ldots, c_m), S_i(C_1, C_2, \ldots, C_m)]$$

where:
[d,D] is said conclusion aggregation interval;
$[c_1,C_1], [c_2,C_2], \ldots, [c_m,C_m]$ are m said conclusion detachment intervals respectively associated with the same conclusion being aggregated; and
$S_i$ is a triangular conorm (T-conorm) function selected from a second function set comprising the predetermined T-conorm functions $S_2$, $S_{2.5}$ and $S_3$.

8. The reasoning with uncertainty method of claim 7 wherein each said T-norm function $T_i$ is selected from said first function set in accordance with an attitude toward uncertainty evaluation, such that:
the T-norm function $T_1$ corresponds to a conservative attitude toward uncertainty evaluation;
the T-norm function $T_2$ corresponds to an intermediate attitude toward uncertainty evaluation; and
the T-norm function $T_3$ corresponds to a nonconservative attitude toward uncertainty evaluation;
each said T-conorm function $S_i$ being selected in accordance with whether the rules providing the same conclusion being aggregated are characterized as being correlated, such that:
said T-conorm function $S_2$ is selected for aggregating the same conclusions provided by uncorrelated rules;
said T-conorm function $S_3$ is selected for aggregating the same conclusions provided by correlated rules; and
said T-conorm function $S_{2.5}$ is selected for aggregating the same conclusions being provided by rules characterized as being intermediate between correlated and uncorrelated.

9. The reasoning with uncertainty method of claim 1 wherein selected ones of said rules are each associated with a respective source of rule firing context information; and
said method including the additional step of evaluating, prior to the firing of each said selected rule, said context information to determine whether an appropriate context exists for the rule firing.

10. A rule-based reasoning system for reasoning with uncertainty for practice on a computer, comprising:
a knowledge base portion comprising a plurality of system rules each having a premise and a conclusion to be determined true upon finding the premise true, said premise comprising at least one clause including a variable to which a value can be assigned;
a representation portion for representing to a system user a value certainty interval associated with each value assigned to one of said rule premise variables, said value certainty interval having a lower and an upper bound respectively representative of amounts of confirmation and failure of refutation of the assigned value;
said representation portion additionally representing to the user a sufficiency factor and a necessity factor associated with each said rule, said sufficiency factor representing a strength of belief that said rule conclusion is true given said rule premise is true, said necessity factor representing a strength of belief that said rule conclusion is false given said rule premise is false;
a control portion for selecting computational functions in accordance with which the value certainty interval associated with each said assigned value is propagated through said rule based system;
an inference portion for computing a premise certainty interval from the value certainty intervals respectively associated with the values assigned to the premise clauses, a lower bound of said premise certainty interval being a first computational function of the respective value certainty interval lower bounds, said first function being selected in said control portion, an upper bound of said premise certainty interval being said first function of the respective value certainty interval upper bounds; and
said inference portion firing each said rule by computing a conclusion detachment interval having a lower and an upper bound, the conclusion detachment interval lower bound being a second computational function of both said rule sufficiency factor and said premise certainty interval lower bound, the conclusion detachment interval upper bound being a third computational function of both said rule necessity factor and said premise certainty interval upper bound, said second and third functions being selected by said control portion, said conclusion detachment interval lower and upper bounds being respectively representative of the amounts of confirmation and failure of refutation of the rule conclusion.

11. A rule-based reasoning system for reasoning with uncertainty for practice on a computer, comprising:
a knowledge base portion comprising a plurality of system rules each having a premise and a conclusion to be determined true upon finding the premise true, said premise comprising at least one clause including a variable to which a value can be assigned;
a representation portion for representing to a system user a value certainty interval associated with each value assigned to one of said rule premise variables, said value certainty interval having a lower and an upper bound respectively representative of amounts of confirmation and failure of refutation of the assigned value;

said representation portion additionally representing to the user a sufficiency factor and a necessity factor associated with each said rule, said sufficiency factor representing a strength of belief that said rule conclusion is true given said rule premise is true, said necessity factor representing a strength of belief that said rule conclusion is false given said rule premise is false;

a control portion for selecting computational functions in accordance with the value certainty interval associated with each said assigned value is propagated through said rule based system;

an inference portion for computing a premise certainty interval from the value certainty intervals respectively associated with the values assigned to the premise clauses, a lower bound of said premise certainty interval being a first computational function of the respective value certainty interval lower bounds, said first function being selected in said control portion, an upper bound of said premise certainty being said first function of the respective value certainty interval upper bounds; and said inference portion firing each said rule by computing a conclusion detachment interval having a lower and an upper bound, a conclusion detachment interval lower bound being a second computational function of both said rule sufficiency factor and said premise certainty interval lower bound, the conclusion detachment interval upper bound being a third computational function of both said rule necessity factor and said premise certainty interval upper bound, said second and third functions being selected by said control portion, said conclusion detachment interval lower and upper bounds being respectively representative of the amounts of confirmation and failure of refutation of the rule conclusion, and wherein said inference portion is adapted to compute a conclusion aggregation certainty interval for the same conclusion provided by more than one rule in a predetermined group of said rules, a lower bound of said conclusion aggregation interval being a fourth computational function of the conclusion detachment interval lower bounds respectively computed for the rules providing the same conclusion, an upper bound of said conclusion aggregation interval being said fourth function of the conclusion detachment interval upper bounds respectively computed for the rules providing the same conclusion, said fourth function being selected by said control portion, said conclusion aggregation interval lower and upper bounds being respectively representative of the amount of confirmation and failure of refutation of the aggregated conclusion.

12. The reasoning with uncertainty system of claim 11 wherein said inference portion is adapted to compute a source consensus certainty interval for a plurality of said conclusion aggregation intervals for the same conclusion, said source consensus interval being the intersection of said plurality of conclusion aggregation intervals.

13. The reasoning with uncertainty system of claim 11 wherein a selected conclusion can be excluded from the computation of said conclusion aggregation interval, said selected conclusion having an associated certainty interval; and said inference portion being adapted to compute a source consensus certainty interval that is the intersection of the associated certainty interval of said selected conclusion with each said conclusion aggregation interval computed for the same conclusion as said selected conclusion.

14. The reasoning with uncertainty system of claim 10 wherein said value certainty, premise certainty and conclusion detachment intervals are defined on an interval [0,1.0];

said inference portion computing said premise certainty interval in accordance with the equation:

$$[b,B] = [T_i(a_1, a_2, \ldots, a_m), T_i(A_1, A_2, \ldots, A_m)]$$

where:

[b,B] is said premise certainty interval;

$[a_1, A_1], [a_2, A_2], \ldots, [a_m, A_m]$ are m said value certainty intervals associated with the values assigned to the premise variables; and $T_i$ is a triangular norm (T-norm) function selected from a first function set comprising the predetermined T-norm functions $T_1$, $T_2$ and $T_3$; and said inference portion computing said conclusion detachment interval in accordance with the equation:

$$[c,C] = [T_i(s,b), N(T_i(n, N(B)))]$$

where:

[c,C] is said conclusion detachment interval;

$T_i$ is the T-norm function selected from said first function set;

s is said rule sufficiency factor;

n is said rule necessity factor;

[b,B] is said premise certainty interval; and

N is a negation operator such that $N(\alpha) = 1 - \alpha$.

15. The reasoning with uncertainty system of claim 14 wherein said control portion selects each said T-norm function $T_i$ for use by said inference portion in computing said premise certainty and conclusion detachment intervals;

each said T-norm function $T_i$ corresponding to a different attitude toward uncertainty evaluation such that:

the T-norm function $T_1$ corresponds to a conservative attitude toward uncertainty evaluation;

the T-norm function $T_2$ corresponds to an intermediate attitude toward uncertainty evaluation; and the T-norm function $T_3$ corresponds to a nonconservative attitude toward uncertainty evaluation.

16. The reasoning with uncertainty method of claim 11 wherein said value certainty, premise certainty, conclusion detachment and conclusion aggregation intervals are defined on an interval [0,1.0];

said inference portion computing said premise certainty interval in accordance with the equation:

$$[b,B] = [T_i(a_1, a_2, \ldots, a_m), T_i(A_1, A_2, \ldots, A_m)]$$

where:

[b,B] is said premise certainty interval;

$[b_1, A_1], [a_2, A_2], \ldots, [a_m, A_m]$ are m said value certainty intervals associated with the values assigned to the premise variables; and $T_i$ is a triangular norm (T-norm) function selected from a first function set comprising the predetermined T-norm functions $T_1$, $T_2$ and $T_3$;

said inference portion computing said conclusion detachment interval in accordance with the equation:

$$[c,C]=[T_i(s,b),N(T_i(n,N(B)))]$$

where:

[c,C] is said conclusion detachment interval;
$T_i$ is the T-norm function selected from said first function set;
s is said rule sufficiency factor;
n is said rule necessity factor;
[b,B] is said premise certainty interval; and
N is a negation operator such that $N(\alpha)=1-\alpha$; and said inference portion computing said conclusion aggregation interval in accordance with the equation:

$$[d,D]=[S_i(c_1,c_2,\ldots,c_m),S_i(C_1, C_2,\ldots,C_m)]$$

where:

[d,D] is said conclusion aggregation interval;
$[c_1,C_1], [c_2,C_2], \ldots, [C_m, C_m]$ are m said conclusion detachment intervals respectively associated with the same conclusion being aggregated; and
$S_i$ is a triangular conorm (T-conorm) function selected from a second function set comprising the predetermined T-conorm functions $S_2$, $S_{2.5}$ and $S_3$.

17. The reasoning with uncertainty system of claim 16 wherein said control portion selects each said T-norm function $T_i$ for use by said inference portion in computing said premise certainty and conclusion detachment intervals, each said T-norm function $T_i$ corresponding to a different attitude toward uncertainty evaluation such that:

the T-norm function $T_1$ corresponds to a conservative attitude toward uncertainty evaluation;
the T-norm function $T_2$ corresponds to an intermediate attitude toward uncertainty evaluation; and
the T-norm function $T_3$ corresponds to a nonconservative attitude toward uncertainty evaluation.

said control portion selecting each said T-conorm function $S_i$ for use by said inference portion in computing said conclusion aggregation interval, each said T-conorm function $S_i$ being selected in accordance with whether the rules providing the same conclusion being aggregated are characterized as being correlated, such that:

said T-conorm function $S_2$ is selected for aggregating the same conclusions provided by uncorrelated rules;
said T-conorm function $S_3$ is selected for aggregating the same conclusions provided by correlated rules; and
said T-conorm function $S_{2.5}$ is selected for aggregating the same conclusions being provided by rules characterized as being intermediate between correlated and uncorrelated.

18. The reasoning with uncertainty system of claim 10 wherein an ignorance measure is maintained in said representation portion and associated with each said value certainty, premise certainty and conclusion detachment interval, said ignorance measure being equal to the arithmetic difference between the upper and lower bound of the interval with which it is associated.

19. The reasoning with uncertainty system of claim 10 wherein selected ones of said rules are each associated with a respective source of rule firing context information; and said control portion evaluating, prior to the firing of each said selected rule, said context information to determine whether an appropriate context exists for the rule firing.

20. A system, for practice on a computer, for reasoning with uncertainty in a rule-based reasoning system comprising a plurality of rules each having a premise and a conclusion to be determined true upon finding the premise to be true, said premise comprising at least one clause including a variable to which a value can be assigned, said reasoning system comprising:

means for associating a value certainty interval with each value assigned to one of said rule premise variables, said value certainty interval having a lower and an upper bound respectively representative of amounts of confirmation and failure of refutation of the assigned value;

means for associating a sufficiency factor and a necessity factor with each said rule, said sufficiency factor representing a strength of belief that the rule conclusion is true given the rule premise is true, said necessity factor representing a strength of belief that the rule conclusion is false given the rule premise is false;

means for computing a premise certainty interval from the value certainty intervals respectively associated with the values assigned to the premise variables, a lower bound of said premise certainty interval being a first predetermined function of the respective value certainty interval lower bounds, an upper bound of said premise certainty interval being said first function of the respective value certainty interval upper bounds; and means for firing each of said rules by computing a conclusion detachment certainty interval having a lower and an upper bound, said conclusion detachment interval lower bound being a second predetermined function of both said rule sufficiency factor and said premise certainty interval lower bound, the conclusion detachment upper bound being a third predetermined function of both said rule necessity factor and said premise certainty interval upper bound, said conclusion detachment interval lower and upper bounds respectively representing the amounts of confirmation and failure of refutation of the rule conclusion.

21. A system, for practice on a computer, for reasoning with uncertainty system in a rule-based reasoning system comprising a plurality of rules each having a premise and a conclusion to be determined true upon finding a premise to be true, said premise comprising at least one clause including a variable to which a value can be assigned, said reasoning system comprising:

means for associating a value certainty interval with each value assigned to one of said rule premise variables, said value certainty interval having a lower and an upper bound respectively representative of amounts of confirmation and failure of refutation of the assigned value;

means for associating a sufficiency factor and a necessity factor with each said rule, said sufficiency factor representing a strength of belief that the rule conclusion is true given the rule premise is true, said necessity factor representing a strength of belief that the rule conclusion is false given the rule premise is false;

means for computing a premise certainty interval from the value certainty intervals respectively associated with the values assigned to the premise variables, a lower bound of said premise certainty interval being a first predetermined function of the respective value certainty interval lower bounds, an upper bound of said premise certainty interval being said first function of the respective value certainty interval upper bounds; and means for firing each of said rules by computing a conclusion detachment certainty interval having a lower and upper bound, said conclusion detachment interval lower bound being a second predetermined function of both said rule sufficiency factor and said premise certainty interval lower bound, the conclusion detachment upper bound being a third predetermined function of both said rule necessity factor and said premise certainty interval upper bound, said conclusion detachment interval lower and upper bounds respectively representing the amounts of confirmation and failure of refutation of the rule conclusion, and wherein upon the same conclusion being provided by more than one rule in a predetermined group of said rules, said system additionally comprises:

means for aggregating the same conclusions by computing a conclusion aggregation certainty interval having a lower bound that is a fourth predetermined function of the conclusion detachment interval lower bounds respectively computed for the rules reaching the same conclusion, an upper bound of said conclusion aggregation interval being said fourth predetermined function of the conclusion detachment interval upper bounds respectively computed for the rules reaching the same conclusion, said conclusion aggregation interval lower and upper bounds being respectively representative of the amount of confirmation and failure of refutation of the aggregated conclusion.

22. The reasoning with uncertainty system of claim 21 wherein upon computing a plurality of said conclusion aggregation intervals for the same conclusion, said system further comprises:

means for computing a source consensus certainty interval by taking the intersection of said plurality of conclusion aggregation intervals.

23. The reasoning with uncertainty system of claim 21 further comprising:

means for excluding a selected conclusion from said aggregating step even though said selected conclusion is the same as the aggregated conclusions, said selected conclusion having an associated certainty interval; and means for computing a source consensus certainty interval by taking the intersection of the associated certainty interval of said selected conclusion with each said conclusion aggregation interval computed for the same conclusion.

24. The reasoning with uncertainty system of claim 20 wherein said value certainty, premise certainty and conclusion detachment intervals are defined on an interval [0,1.0];

said premise certainty interval being computed in accordance with the equation:

$$[b,B] = [T_i(a_1, a_2, \ldots, a_m), T_i(A_1, A_2, \ldots, A_m)]$$

where:

[b,B] is said premise certainty interval;

$[a_1,A_1], [a_2,A_2], \ldots, [a_m, A_m]$ are m said value certainty intervals associated with the values assigned to the premise variables; and $T_i$ is a triangular norm (T-norm) function selected from a first function set comprising the predetermined T-norm functions $T_1$, $T_2$ and $T_3$; and said conclusion detachment interval being computed in accordance with the equation:

$$[c,C] = [T_i(s,b), N(T_i(n, N(B)))]$$

where:

[c,C] is said conclusion detachment interval;

$T_i$ is the T-norm function selected from said first function set;

s is said rule sufficiency factor;

n is said rule necessity factor;

[b,B] is said premise certainty interval; and

N is a negation operator such that $N(\alpha) = 1 - \alpha$.

25. The reasoning with uncertainty system of claim 24 wherein each said T-norm function $T_i$ is selected from said first function set in accordance with an attitude toward uncertainty evaluation;

the T-norm function $T_1$ corresponding to a conservative attitude toward uncertainty evaluation;

the T-norm function $T_2$ corresponding to an intermediate attitude toward uncertainty evaluation; and the T-norm function $T_3$ corresponding to a nonconservative attitude toward uncertainty evaluation.

26. The reasoning with uncertainty system of claim 21 wherein said value certainty, premise certainty, conclusion detachment and conclusion aggregation intervals are defined on an interval [0,1.0];

said premise certainty interval being computed in accordance with the equation:

$$[b,B] = [T_i(a_1, a_2, \ldots, a_m), T_i(A_1, A_2, \ldots, A_m)]$$

where:

[b,B] is said premise certainty interval;

$[a_1,A_1], [a_2,A_2], \ldots, [a_m,A_m]$ are m said value certainty intervals associated with the values assigned to the premise variables; and $T_i$ is a triangular norm (T-norm) function selected from a first function set comprising the predetermined T-norm functions $T_1$, $T_2$ and $T_3$;

said conclusion detachment interval being computed in accordance with the equation:

$$[c,C] = [T_i(s,b), N(T_i(n, N(B)))]$$

where:

[c,C] is said conclusion detachment interval;

$T_i$ is the T-norm function selected from said first function set;

s is said rule sufficiency factor;

n is said rule necessity factor;

[b,B] is said premise certainty interval; and

N is a negation operator such that $N(\alpha) = 1 - \alpha$; and said conclusion aggregation interval being computed in accordance with the equation:

$$[d,D] = [S_i(c_1, c_2, \ldots, c_m), S_i(C_1, C_2, \ldots, C_m)]$$

where:

[d,D] is said conclusion aggregation interval;

$[c_1,C_1], [c_2,C_2], \ldots, [c_m,C_m]$ are m said conclusion detachment intervals respectively associated with the same conclusion being aggregated; and $S_i$ is a triangular conorm (T-conorm) function selected from a second function set comprising the predetermined T-conorm functions $S_2$, $S_{2.5}$ and $S_3$.

27. The reasoning with uncertainty system of claim 26 wherein each said T-norm function $T_i$ is selected from said first function set in accordance with an attitude toward uncertainty evaluation, such that:

the T-norm function $T_1$ corresponds to a conservative attitude toward uncertainty evaluation;

the T-norm function $T_2$ corresponds to an intermediate attitude toward uncertainty evaluation; and the T-norm function $T_3$ corresponds to a nonconservative attitude toward uncertainty evaluation;

each said T-conorm function $S_i$ being selected in accordance with whether the rules providing the same conclusion being aggregated are characterized as being correlated, such that:

said T-conorm function $S_2$ is selected for aggregating the same conclusions provided by uncorrelated rules;

said T-conorm function $S_3$ is selected for aggregating the same conclusions provided by correlated rules; and said T-conorm function $S_{2.5}$ is selected for aggregating the same conclusions being provided by rules characterized as being intermediate between correlated and uncorrelated.

28. The reasoning with uncertainty system of claim 20 wherein selected ones of said rules are each associated with a respective source of rule firing context information; and said system additionally including means for evaluating, prior to the firing of each said selected rule, said context information to determine whether an appropriate context exists for the rule firing.

* * * * *